(12) United States Patent
Chen et al.

(10) Patent No.: US 11,714,317 B2
(45) Date of Patent: Aug. 1, 2023

(54) DISPLAY APPARATUS

(71) Applicant: Coretronic Corporation, Hsin-Chu (TW)

(72) Inventors: Ping-Yen Chen, Hsin-Chu (TW); Wen-Chun Wang, Hsin-Chu (TW); Chung-Yang Fang, Hsin-Chu (TW); Jen-Wei Yu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 168 days.

(21) Appl. No.: 17/474,061

(22) Filed: Sep. 14, 2021

(65) Prior Publication Data

US 2022/0276522 A1 Sep. 1, 2022

Related U.S. Application Data

(60) Provisional application No. 63/093,288, filed on Oct. 18, 2020.

(30) Foreign Application Priority Data

Dec. 11, 2020 (CN) .......................... 202011457055.7

(51) Int. Cl.
*G02F 1/13357* (2006.01)
*G02F 1/1335* (2006.01)
*G02F 1/13363* (2006.01)
*G02F 1/1337* (2006.01)

(52) U.S. Cl.
CPC ........ *G02F 1/13362* (2013.01); *G02F 1/1337* (2013.01); *G02F 1/13363* (2013.01); *G02F 1/133512* (2013.01); *G02F 1/133528* (2013.01)

(58) Field of Classification Search
CPC .............. G02F 1/13475; G02F 1/1347; G02F 1/133538; G02F 1/133531; G02F 1/133528; G02B 30/25
USPC ...................................... 349/15, 74
See application file for complete search history.

(56) References Cited

FOREIGN PATENT DOCUMENTS

| CN | 108983483 | 12/2018 |
| CN | 110133882 | 8/2019 |
| CN | 110297367 | 10/2019 |

*Primary Examiner* — Edward J Glick
*Assistant Examiner* — David Y Chung
(74) *Attorney, Agent, or Firm* — JCIPRNET

(57) ABSTRACT

A display apparatus is provided, including at least one viewing angle limiting device, a display panel, and a light polarization converter disposed between the at least one viewing angle limiting device and the display panel. The light polarization converter includes first regions and second regions alternately arranged. Light beams passing through the first regions and the second regions respectively have a first light polarization direction and a second light polarization direction. The light polarization converter is overlapped with the at least one viewing angle limiting device and the display panel. The viewing angle limiting device includes light-absorbing molecules. The light-absorbing molecules have a first absorption coefficient in a thickness direction of the viewing angle limiting device and a second absorption coefficient in a direction perpendicular to the thickness direction. A ratio of the first absorption coefficient to the second absorption coefficient is greater than 1.

19 Claims, 30 Drawing Sheets

DISPLAY APPARATUS

CROSS-REFERENCE TO RELATED APPLICATION

This application claims the priority benefit of U.S. provisional application No. 63/093,288, filed on Oct. 18, 2020, and China application no. 202011457055.7, filed on Dec. 11, 2020. The entirety of each of the above-mentioned patent applications is hereby incorporated by reference herein and made a part of this specification.

BACKGROUND

Technical Field

The disclosure relates to a display apparatus; particularly, the disclosure relates to a display apparatus that is anti-peeping.

Description of Related Art

Generally speaking, display apparatuses usually have a wide viewing angle display for viewers to watch together. However, in some situations or occasions, such as when browsing private webpages or confidential information, or entering passwords in public, the wide viewing angle display is likely to adversely cause the screen to be peeped by others, resulting in leakage of confidential information. The general practice for anti-peeping is to place a light control film (LCF) in front of the display panel to filter out image beams from a large angle. On the contrary, when anti-peeping is not required, the light control film is then manually removed from in front of the display panel. In other words, although such a light control film can be anti-peeping, there is still room for improvement in the convenience of its operation. Therefore, how to develop a display apparatus of which viewing angle switching is convenient and anti-peeping is also achieved has become an issue for related manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a display apparatus that switches between anti-peeping modes in different directions and a sharing mode with a full viewing angle.

According to an embodiment of the disclosure, a display apparatus includes a light polarization converter, at least one viewing angle limiting device, and a display panel. The light polarization converter includes a plurality of first regions and a plurality of second regions alternately arranged. Light beams passing through the first regions and the second regions respectively have a first light polarization direction and a second light polarization direction. The at least one viewing angle limiting device is overlapped with the light polarization converter. The viewing angle limiting device includes a plurality of light-absorbing molecules. The light-absorbing molecules have a first absorption coefficient in a thickness direction of the viewing angle limiting device and a second absorption coefficient in a direction perpendicular to the thickness direction. A ratio of the first absorption coefficient to the second absorption coefficient is greater than 1. The display panel is overlapped with the at least one viewing angle limiting device. The light polarization converter is disposed between the at least one viewing angle limiting device and the display panel.

Based on the foregoing, according to an embodiment of the disclosure, in the display apparatus, the absorption coefficient of the viewing angle limiting device in the thickness direction thereof is greater than the absorption coefficient in the direction perpendicular to the thickness direction, accordingly increasing filtering of the viewing angle limiting device on non-normally incident polarized light beams. The light beams from the display panel has different polarization directions after passing through the first regions and the second regions of the light polarization converter, and light beams with a specific polarization direction are absorbed after being obliquely incident into the viewing angle limiting device. Through different dimming characteristics of the two regions of the light polarization converter, anti-peeping in different directions is realized. On the other hand, with the assistance of display signal control from the display panel, the display apparatus switches between the different anti-peeping modes and the sharing mode with a full viewing angle, facilitating an increase in applicability and operating convenience of the display apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the direction of the Figure(s) being described. The components of the present invention can be positioned in a number of different directions. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
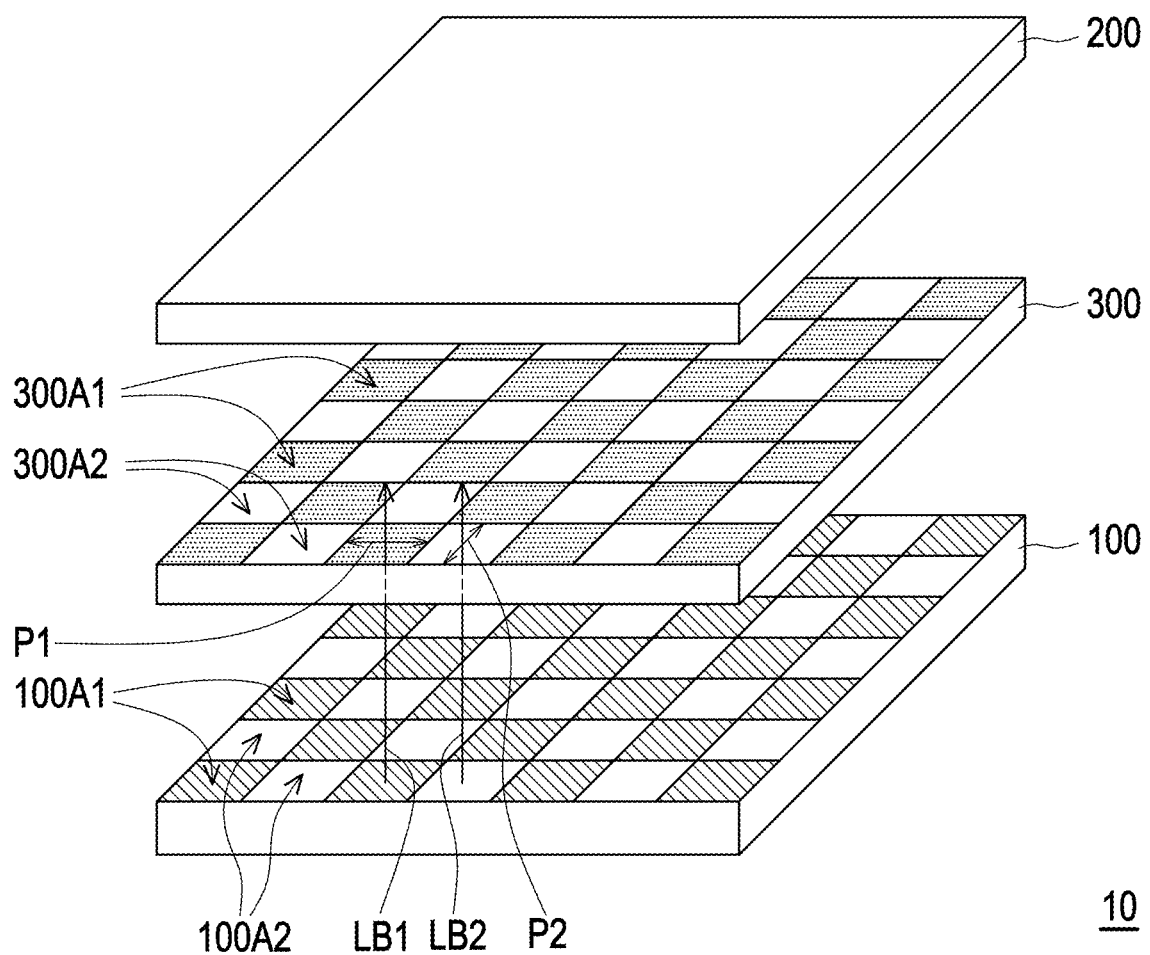
FIG. 1 is a schematic diagram of a display apparatus according to the first embodiment of the disclosure.

FIG. 1 is a schematic diagram of a display apparatus according to the first embodiment of the disclosure. FIG. 2A to FIG. 2D are schematic cross-sectional views in different planes of the display apparatus of FIG. 1 operating in different anti-peeping modes and a sharing mode. In particular, for the sake of clarity, illustration of substrate is omitted in FIG. 2A to FIG. 2D.

Figure 2A:
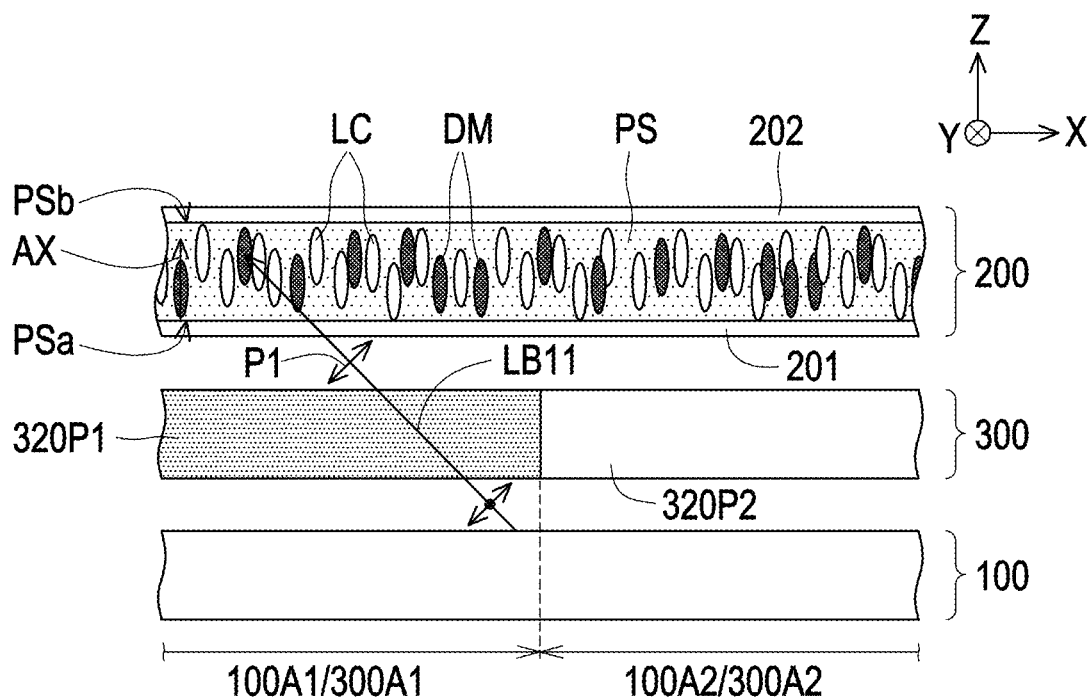
FIG. 2A to FIG. 2D are schematic cross-sectional views in different planes of the display apparatus of FIG. 1 operating in different anti-peeping modes and a sharing mode.
Figure 2B:
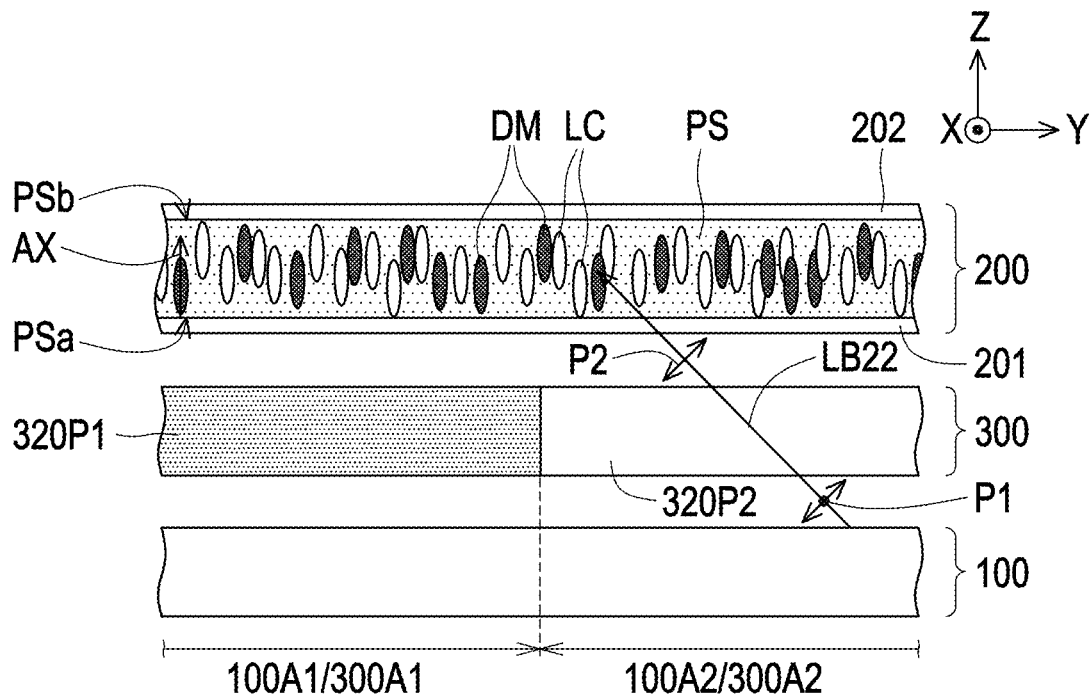
Figure 2C:
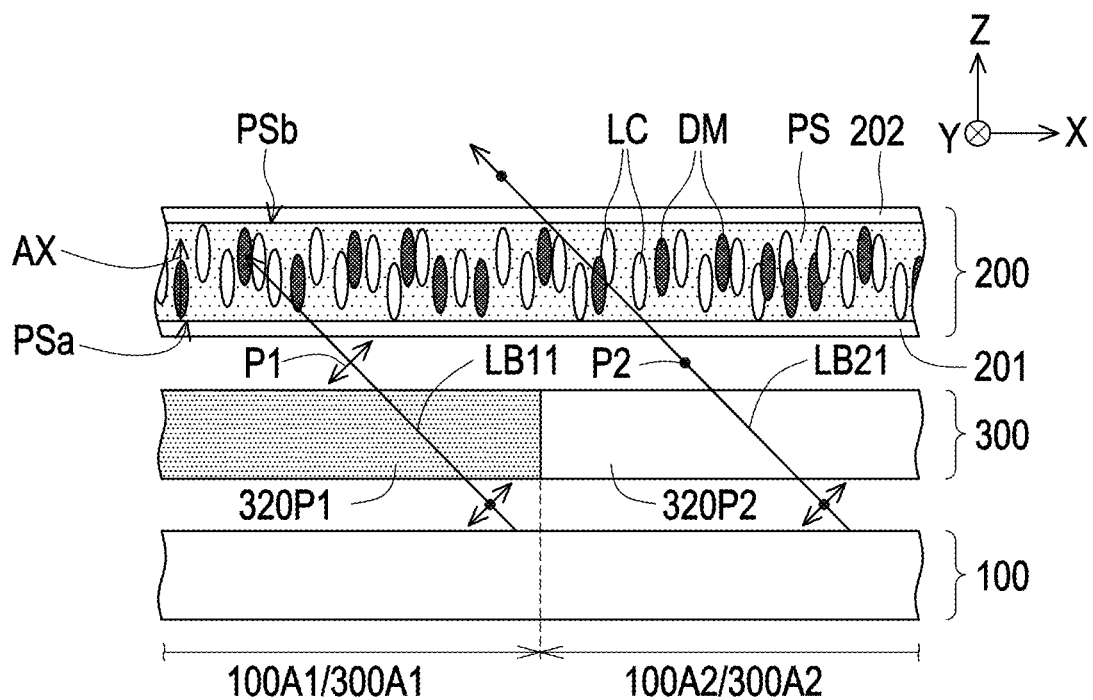
Figure 2D:
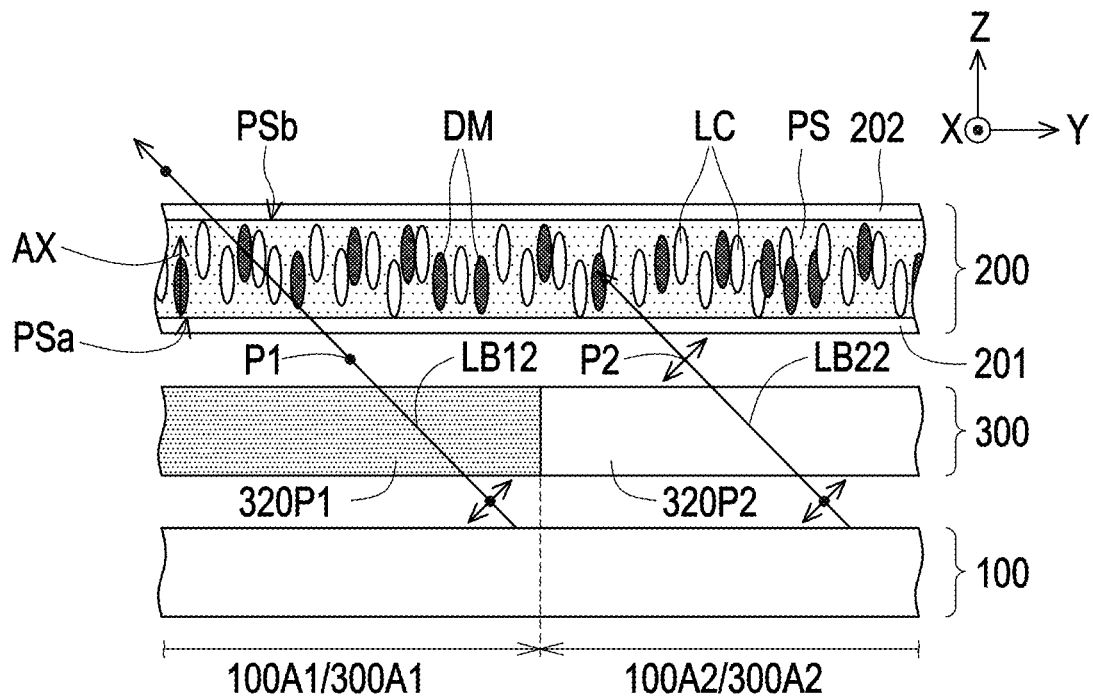

With reference to FIG. 1 and FIG. 2D, a display apparatus 10 includes a display panel 100, a viewing angle limiting device 200, and a light polarization converter 300 that overlap each other, and the light polarization converter 300 is disposed between the viewing angle limiting device 200 and the display panel 100. In this embodiment, the display panel 100 is a self-luminous display panel, for example, an organic light emitting diode (OLED) panel, a micro light emitting diode (micro-LED) panel, or a mini light emitting diode (mini-LED) panel. Nonetheless, the disclosure is not limited thereto.

The viewing angle limiting device 200 includes a plurality of light-absorbing molecules. The light-absorbing molecules have a first absorption coefficient in a thickness direction (e.g., a direction Z) of the viewing angle limiting device 200, and have a second absorption coefficient perpendicular to the thickness direction (e.g., a direction X or a direction Y), and the first absorption coefficient is different from the second absorption coefficient. For example, a ratio of the first absorption coefficient to the second absorption coefficient is greater than 1 (i.e., the first absorption coefficient is greater than the second absorption coefficient). Furthermore, the viewing angle limiting device 200 may also include a polymer substrate PS, and the light-absorbing molecules are dispersedly disposed in the polymer substrate PS. In this embodiment, the light-absorbing molecules are, for example, light-absorbing materials such as dye molecules DM, iodine molecules, or iodine ions. Nonetheless, the disclosure is not limited thereto. The polymer substrate PS includes a substrate surface PSa, and an axial direction of an absorption axis AX of the dye molecules DM may be perpendicular to the substrate surface PSa of the polymer substrate PS (e.g., the axial direction of the absorption axis AX being parallel to the thickness direction of the viewing angle limiting device 200). In particular, the dye molecules DM have the first absorption coefficient in a thickness direction of the polymer substrate PS (i.e., the normal direction of the substrate surface PSa, e.g., the direction Z), and have the second absorption coefficient perpendicular to the thickness direction (e.g., the direction X or the direction Y), where the first absorption coefficient is different from the second absorption coefficient.

In this embodiment, the first absorption coefficient of the dye molecules DM is significantly greater than the second absorption coefficient, and the ratio of the first absorption coefficient to the second absorption coefficient is between 2 and 10,000. Accordingly, for the viewing angle limiting device 200, filtering in a side view and a light transmittance within a viewing angle range are effectively increased, thereby increasing privacy performance of the display apparatus 10 and overall brightness of light rays from other viewing angles after being emitted from the display apparatus 10. In a preferred embodiment, the ratio of the first absorption coefficient to the second absorption coefficient of the dye molecules DM may be between 100 and 1,000. In another preferred embodiment, the ratio of the first absorption coefficient to the second absorption coefficient of the dye molecules DM may also be between 500 and 1,000.

For example, when a light beam from the light polarization converter 300 (e.g., a light beam LB11 of FIG. 2A and a light beam LB22 of FIG. 2B) is obliquely incident into the viewing angle limiting device 200, with an electric field polarization direction thereof not perpendicular to the axial direction of the absorption axis AX of the dye molecules DM, then at least part of light energy of the light beam will be absorbed by the dye molecules DM. In addition, since light beams from different incident angles have different light path lengths in the viewing angle limiting device 200, the degrees of light energy absorption are also different. For example, for a light beam, as an incident angle increases, light energy absorbed by the dye molecules DM increases. On the contrary, when a light beam (e.g., a light beam LB21 of FIG. 2C and a light beam LB12 of FIG. 2D) from the polarization converter 300 is obliquely incident into the viewing angle limiting device 200, with an electric field polarization direction thereof perpendicular to the axial direction of the absorption axis AX of the dye molecules DM, then the light beam will not be absorbed by the dye molecules DM. In other words, in the viewing angle limiting device 200, a large viewing angle filtering is generated for a light beam with a specific polarization direction, and the filtering may be adjusted by changing a concentration or the absorption coefficient of the dye molecules DM, or a film thickness of the polymer substrate PS.

For example, the material of the dye molecules DM includes an azo-type compound or an anthraquinone-type compound, the material of the polymer substrate PS includes a liquid crystal polymer, where the liquid crystal polymer may be formed by an ultraviolet irradiation process on a liquid crystal mixed material layer, and the liquid crystal mixed material layer includes a plurality of liquid crystal molecules LC, a reactive mesogen with a specific doping concentration, and a photo initiator. Nonetheless, the disclosure is not limited thereto. According to another embodiment, the liquid crystal polymer may also include a material of a chemical functional group with a dichroic dye structure or the like. That is, in that another embodiment, it is possible that the viewing angle limiting device does not include the dye molecules DM.

In this embodiment, the viewing angle limiting device 200 may also selectively include a protective layer 201 and a protective layer 202, respectively disposed on the substrate surface PSa and a substrate surface PSb on two opposite sides of the polymer substrate PS. The protective layer 201 and protective layer 202 may include, but is not limited to, a hard coating film, a low-reflection film, an anti-reflection film, an anti-smudge film, an anti-fingerprint film, an anti-glare film, an anti-scratch film, or a composite film layer of the above.

Furthermore, with further reference to FIG. 1, in this embodiment, the light polarization converter 300 includes a plurality of first regions 300A1 and a plurality of second regions 300A2 alternately arranged. For example, in this embodiment, the first regions 300A1 and the second regions 300A2 are alternately arranged respectively in the direction X and the direction Y, exhibited in a checkerboard-shape distribution, but they are not limited thereto. In another embodiment, the first regions and the second regions may as well be alternately arranged in only one dimension and extend in another dimension, forming a stripe-shape distribution.

After passing through the first regions 300A1 and the second region 300A2, light beams from the display panel 100 respectively have a first light polarization direction P1 and a second light polarization direction P2, and the first light polarization direction P1 intersects the second light polarization direction P2. Nonetheless, the disclosure is not limited thereto. In another embodiment, the first polarization direction P1 and the second polarization direction P2 are not limited to being intersected. For example, the display panel 100 includes first display sub-regions 100A1 corresponding to the first regions 300A1 and second display sub-regions 100A2 corresponding to the second regions 300A2. After passing the first regions 300A1 of the light polarization converter 300, a light beam LB1 from the first display sub-regions 100A1 has the first light polarization direction P1, and after passing through the second regions 300A2 of the light polarization converter 300, a light beam LB2 from the second display sub-regions 100A2 has the second light polarization direction P2, where the first light polarization direction P1 is, for example, perpendicular to the second light polarization direction P2.

Figure 3:
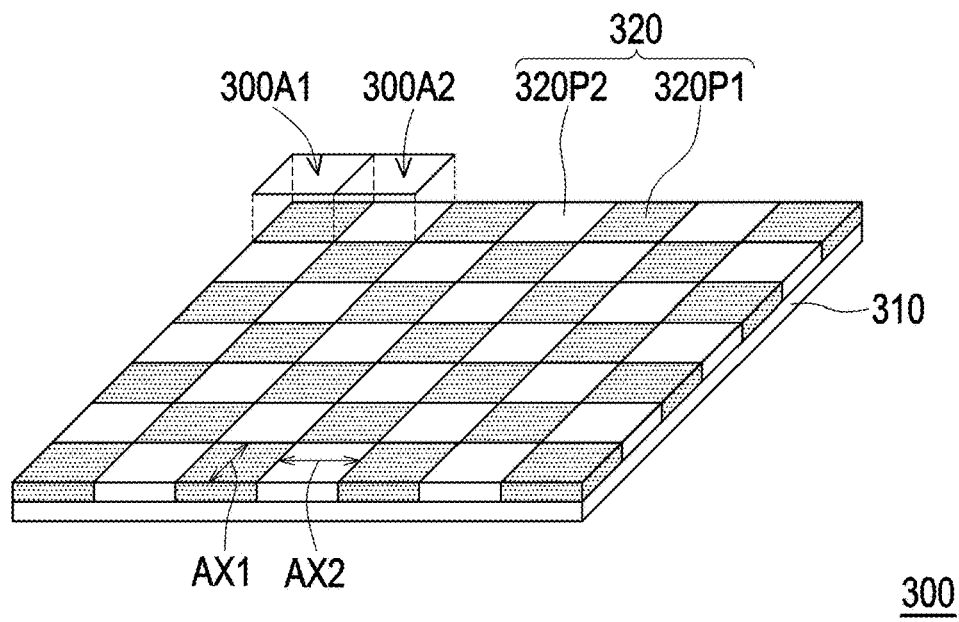
FIG. 3 is a schematic diagram of the light polarization converter of FIG. 1.

FIG. 3 is a schematic diagram of the light polarization converter of FIG. 1. With reference to FIG. 3, in this embodiment, the light polarization converter 300 includes a substrate 310 and a polarization layer 320 disposed on the substrate 310. The material of the substrate 310 includes, for example, glass, epoxy resin, phenol resin, polyimide resin, polyester resin, or other polymer materials with a high light transmittance. The polarization layer 320 includes a plurality of first polarization patterns 320P1 and a plurality of second polarization patterns 320P2. The first polarization patterns 320P1 define the first regions 300A1 of the light polarization converter 300, and have a first absorption axis AX1. The second polarization patterns 320P2 define the second regions 300A2 of the optical polarization converter 300, and have a second absorption axis AX2. The first absorption axis AX1 is perpendicular to the second absorption axis AX2 of the second polarization patterns 320P2.

Figure 5:
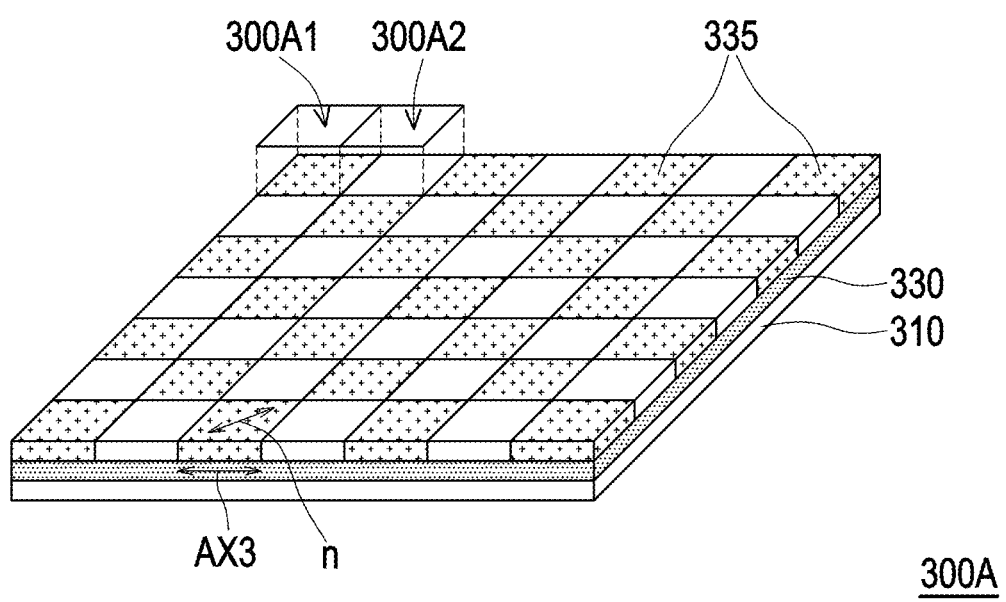
FIG. 5 is a schematic diagram of a light polarization converter according to another embodiment of the disclosure.

Therefore, after passing through the first polarization patterns 320P1, a part of the light beams (e.g., light beam LB1) from the display panel 100 have the first light polarization direction P1 perpendicular to an axial direction of the first absorption axis AX1, and after passing through the second polarization patterns 320P2, another part of the light beams (e.g., the light beam LB2) from the display panel 100 have the second light polarization direction P2 perpendicular to an axial direction of the second absorption axis AX2. Nonetheless, the disclosure is not limited thereto. According to another embodiment, such as the embodiment as shown in FIG. 5, which is a schematic diagram of a light polarization converter according to another embodiment of the disclosure, a polarization layer of a light polarization converter 300A may also be a combination of a linear polarizer 330 and a plurality of optical compensation patterns 335, where the optical compensation patterns 335 are located between the linear polarizer 330 and the viewing angle limiting device 200. That is, the linear polarizer 330 is disposed between the substrate 310 and the optical compensation patterns 335, and the optical compensation patterns 335 are disposed on a light emitting surface side of the linear polarizer 330. The linear polarizer 330 is completely overlapped with the first regions 300A1 and the second regions 300A2 of the light polarization converter 300A. The optical compensation patterns 335 are disposed to be overlapped with the first regions 300A1 (as shown in FIG. 5), and an angle between an axial direction of an optical axis n thereof and an axial direction of an absorption axis AX3 of the linear polarizer 330 is 45 degrees. An in-plane phase retardation of the optical compensation patterns 335 is, for example, one-half wavelength. Therefore, a light polarization direction of a light beam after passing through the first regions 300A1 may be perpendicular to a light polarization direction of a light beam after passing through the second regions 300A2.

In particular, through different dimming characteristics of the two regions of the light polarization converter 300 (or the light polarization converter 300A), the display apparatus 10 is anti-peeping in different directions. In addition, with the assistance of signal control from the display panel 100, the display apparatus 10 switches between the anti-peeping modes in different directions and the sharing mode with a full viewing angle. Hereinafter, exemplary description will be provided for the display apparatus 10 operating in the anti-peeping modes in different directions and the sharing mode with a full viewing angle.

With reference to FIG. 1 and FIG. 2A together, when the display apparatus 10 is operating in a first anti-peeping mode, it is anti-peeping in a large viewing angle in the direction X. For example, a light component of the light beam LB11 transmitted from the first regions 300A1 of the light polarization converter 300 parallel to an XZ plane will be absorbed by the dye molecules DM where its electric field polarization direction (i.e., the first light polarization direction P1) is not perpendicular to the axial direction of the absorption axis AX of the dye molecules DM. When an incident angle of the light beam LB11 (i.e., an angle between a light path of the light beam LB11 and the normal direction of the substrate surface PSa) exceeds a specific angle, its light energy will be absorbed by the dye molecules DM and cannot pass through the viewing angle limiting device 200.

Figure 4:
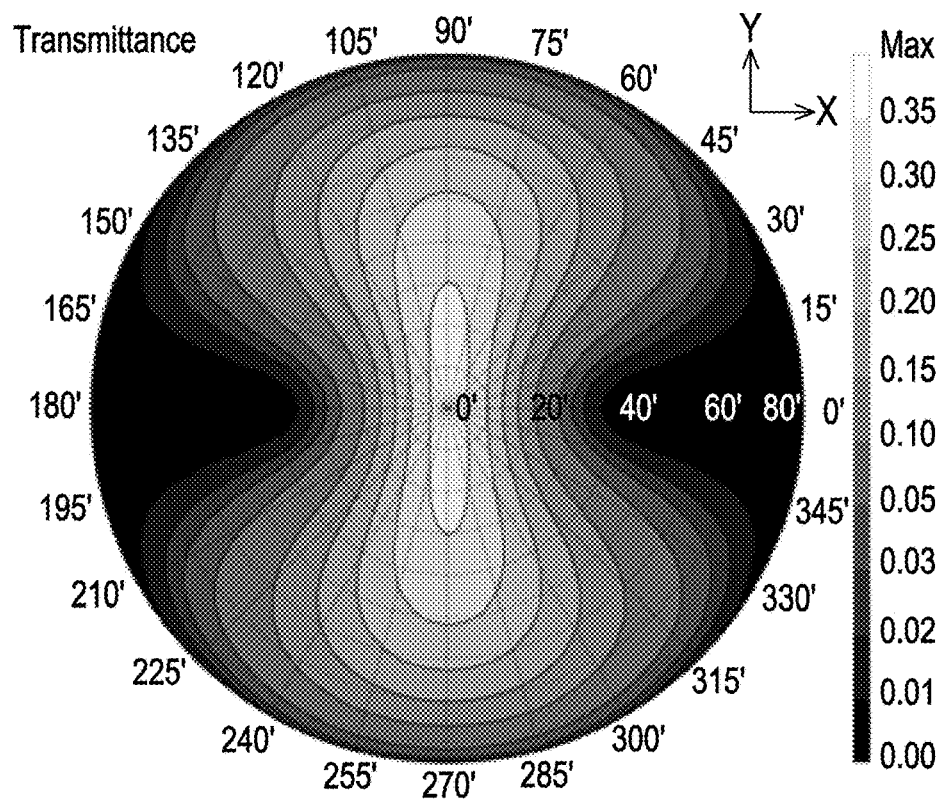
FIG. 4 is a distribution diagram of a transmission rate of the display apparatus of FIG. 1 operating in the first anti-peeping mode.

In order for the display apparatus 10 to be anti-peeping in the direction X (i.e., when the display apparatus 10 is operating in the first anti-peeping mode), in the display panel 100, only pixels (not shown) overlapped with the first display sub-regions 100A1 are enabled (as shown in FIG. 2A). In other words, the display panel 100 at this time provides only the light beam LB11 from the first display sub-regions 100A1, and the second display sub-regions 100A2 do not provide light beams. In this way, a user can only view an image screen generated by a plurality of pixels located in the first display sub-regions 100A1 on the display panel 100 within a specific viewing angle range in the direction X. For example, FIG. 4 is a distribution diagram of a transmission rate of the display apparatus of FIG. 1 operating in the first anti-peeping mode. As shown in FIG. 4, the user can view a relatively clear image screen within a range of ±40 degrees in the horizontal direction.

Next, with reference to FIG. 1 and FIG. 2B, when the display apparatus 10 is operating in a second anti-peeping mode, it is anti-peeping in a large viewing angle in the direction Y. For example, a light component of the light beam LB22 transmitted from the second regions 300A2 of the light polarization converter 300 parallel to a YZ plane will be absorbed by the dye molecules DM where its electric field polarization direction (i.e., the second light polarization direction P2) is not perpendicular to the axial direction of the absorption axis AX of the dye molecules DM. When an incident angle of the light beam LB22 (i.e., the angle between a light path of the light beam LB22 and the normal direction of the substrate surface PSa) exceeds a specific angle, its light energy will be absorbed by the dye molecules DM and cannot pass through the viewing angle limiting device 200.

In order for the display apparatus 10 to be anti-peeping in the direction Y (i.e., when the display apparatus 10 is operating in the second anti-peeping mode), in the display panel 100, only pixels (not shown) overlapped with the second display sub-regions 100A2 are enabled (as shown in FIG. 2B). In other words, the display panel 100 at this time provides only the light beam LB22 from the second display sub-regions 100A2, and the first display sub-regions 100A1 do not provide light beams. In this way, the user can only view an image screen generated by a plurality of pixels located in the second display sub-regions 100A2 on the display panel 100 within a specific viewing angle range in the direction Y.

In particular, when the display apparatus 10 is operating in the sharing mode with a full viewing angle, all pixels of the display panel 100 are enabled and emit light (as shown in FIG. 2C and FIG. 2D). At this time, an electric field polarization direction (i.e., the second light polarization direction P2) of the light beam LB21 transmitted from the second regions 300A2 of the light polarization converter 300 parallel to the XZ plane is perpendicular to the axial direction of the absorption axis AX of the dye molecules DM. Therefore, the light beam LB21 passes through the viewing angle limiting device 200 when the dye molecules DM cannot effectively absorb its light energy, and the user thus views the image screen generated by the pixels located in the second display sub-regions 100A2 in a larger viewing angle in the direction X. On the other hand, an electric field polarization direction (i.e., the first light polarization direction P1) of the light beam LB12 transmitted from the first regions 300A1 of the light polarization converter 300 parallel to the YZ plane is perpendicular to the axial direction of the absorption axis AX of the dye molecules DM. Therefore, the light beam LB12 passes through the viewing angle limiting device 200 when the dye molecules DM cannot effectively absorb its light energy, and the user thus views the image screen generated by the pixels located in the first displaying sub-regions 100A1 in a larger viewing angle in the direction Y. That is, the image screen viewed by the user in a larger viewing angle in the direction X and the direction Y may be respectively formed with the pixels located in different display sub-regions, and thus the screen is viewed in a full viewing angle.

In summary of the above, under the configuration of the viewing angle limiting device 200, with the assistance of the display signal (or pixel) control from the display panel 100, the display apparatus 10 switches between the first anti-peeping mode, the second anti-peeping mode, and the sharing mode with a full viewing angle to meet requirements in different use scenarios. In other words, applicability and operating convenience of the display apparatus 10 are effectively increased.

Other embodiments will be provided hereinafter to describe the disclosure in detail, in which the same components will be annotated with the same reference numerals, and the description of the same technical content will be omitted. For the omitted parts, reference may be made to the foregoing embodiment, and will not be repeatedly described hereinafter.

Figure 6:
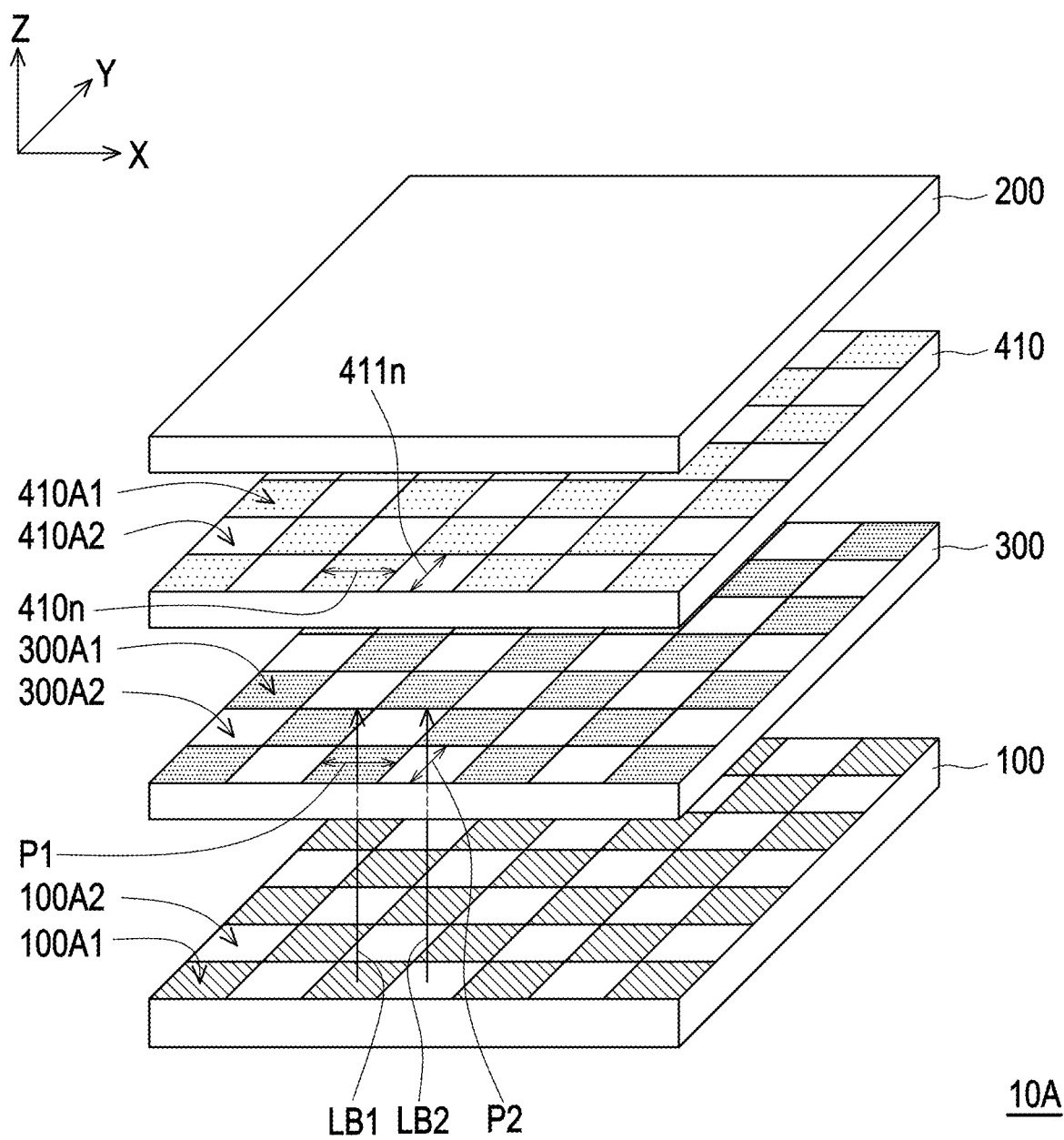
FIG. 6 is a schematic diagram of a display apparatus according to the second embodiment of the disclosure.
Figure 7A:
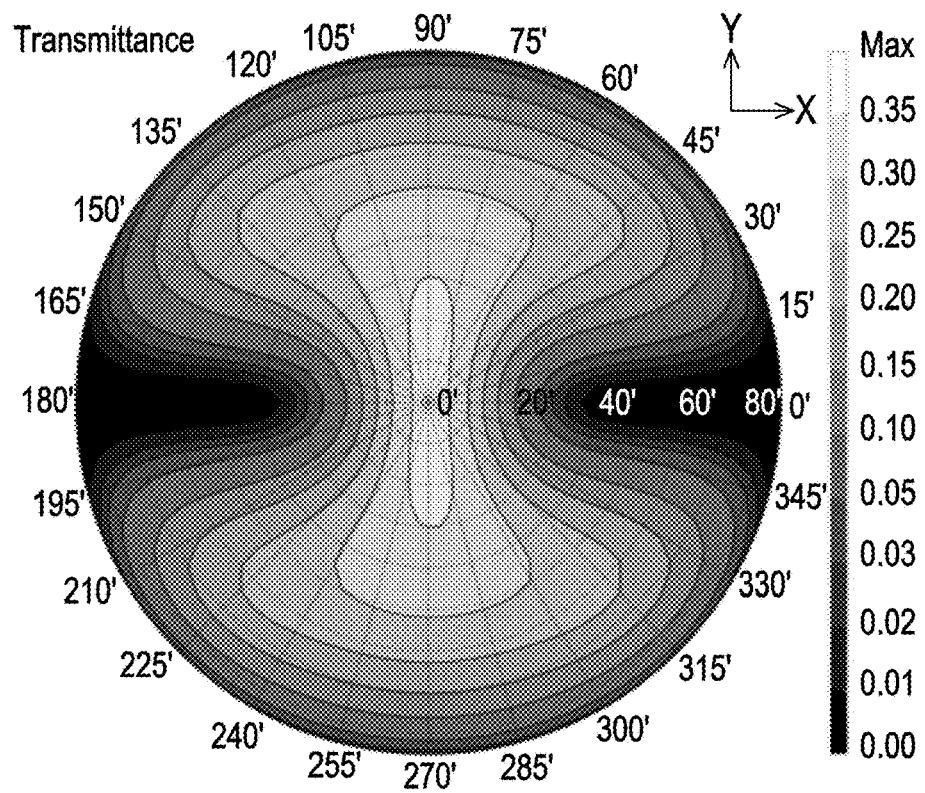
FIG. 7A and FIG. 7B are respectively distribution diagrams of transmission rates of the display apparatus of FIG. 6 under compensation films with different in-plane phase retardations.
Figure 7B:
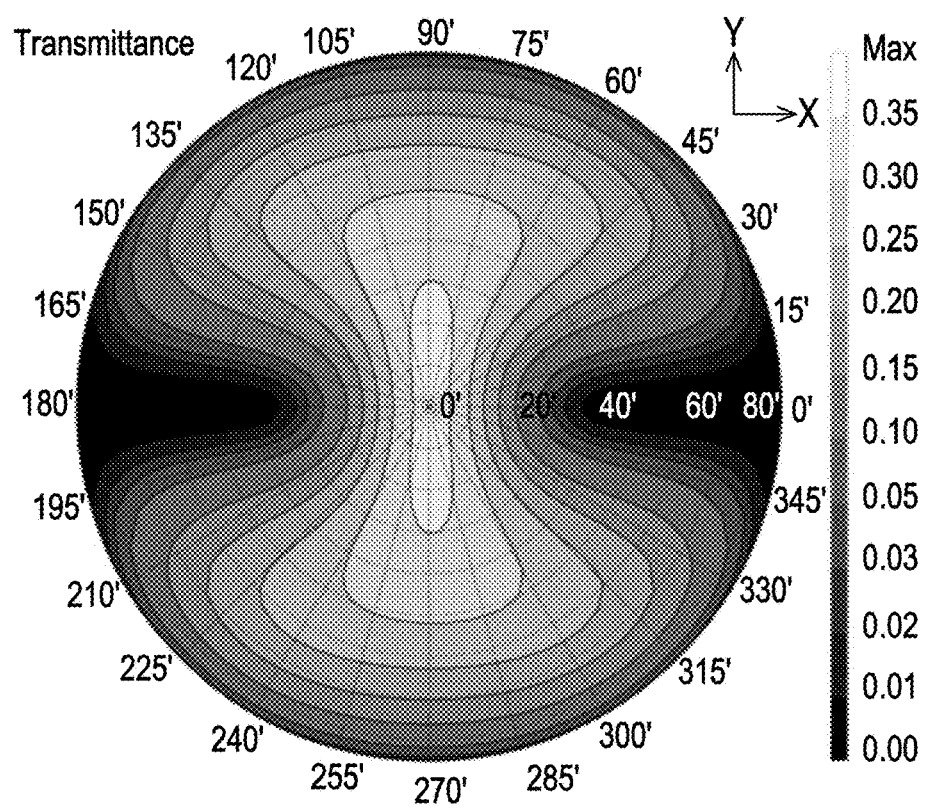

FIG. 6 is a schematic diagram of a display apparatus according to the second embodiment of the disclosure. FIG. 7A and FIG. 7B are respectively distribution diagrams of transmission rates of the display apparatus of FIG. 6 under compensation films with different in-plane phase retardations. With reference to FIG. 6, the difference between a display apparatus 10A of this embodiment and the display apparatus 10 of FIG. 1 lies in that the display apparatus 10A also includes a compensation film 410, disposed between the viewing angle limiting device 200 and the light polarization converter 300. An in-plane phase retardation of the compensation film 410 may be between one-quarter wavelength and one wavelength.

In this embodiment, the compensation film 410 includes a plurality of first partitions (e.g., including a partition 410A1 and a partition 410A2) corresponding to the first regions 300A1 and the second regions 300A2 of the light polarization converter 300. An axial direction of an optical axis 410n of the first partitions (e.g., the partition 410A1) corresponding to the first regions 300A1 is parallel to the first light polarization direction P1. Moreover, an axial direction of an optical axis 411n of the first partitions (e.g., the partition 410A2) corresponding to the second regions 300A2 is parallel to the second light polarization direction P2. Nonetheless, the disclosure is not limited thereto. In another embodiment, it is possible that the compensation film 410 is not partitioned, and the optical axis of the compensation film 410 is, for example, parallel to the first light polarization direction P1 or parallel to the second light polarization direction P2, for example.

Through disposing the compensation film 410, an anti-peeping range (e.g., viewing angle) of the display apparatus 10A can be further adjusted. For example, as shown in FIG. 7A and FIG. 7B, when the in-plane phase retardation of the compensation film 410 is one-half wavelength (corresponding to the transmission rate distribution diagram of FIG. 7A) or 220 nanometers (corresponding to the transmission rate distribution diagram of FIG. 7B), the anti-peeping range of the display apparatus 10A is further reduced compared with the display apparatus 10 (as shown in FIG. 4). More specifically, in this embodiment, the anti-peeping range in the azimuth angle (e.g., the range of 0 degrees±7 degrees in the azimuth angle of FIG. 7A) of the display apparatus 10A is smaller than an anti-peeping range in the azimuth angle (e.g., the range of 0 degrees±14 degrees in the azimuth angle of FIG. 4) of the display apparatus 10.

Figure 8:
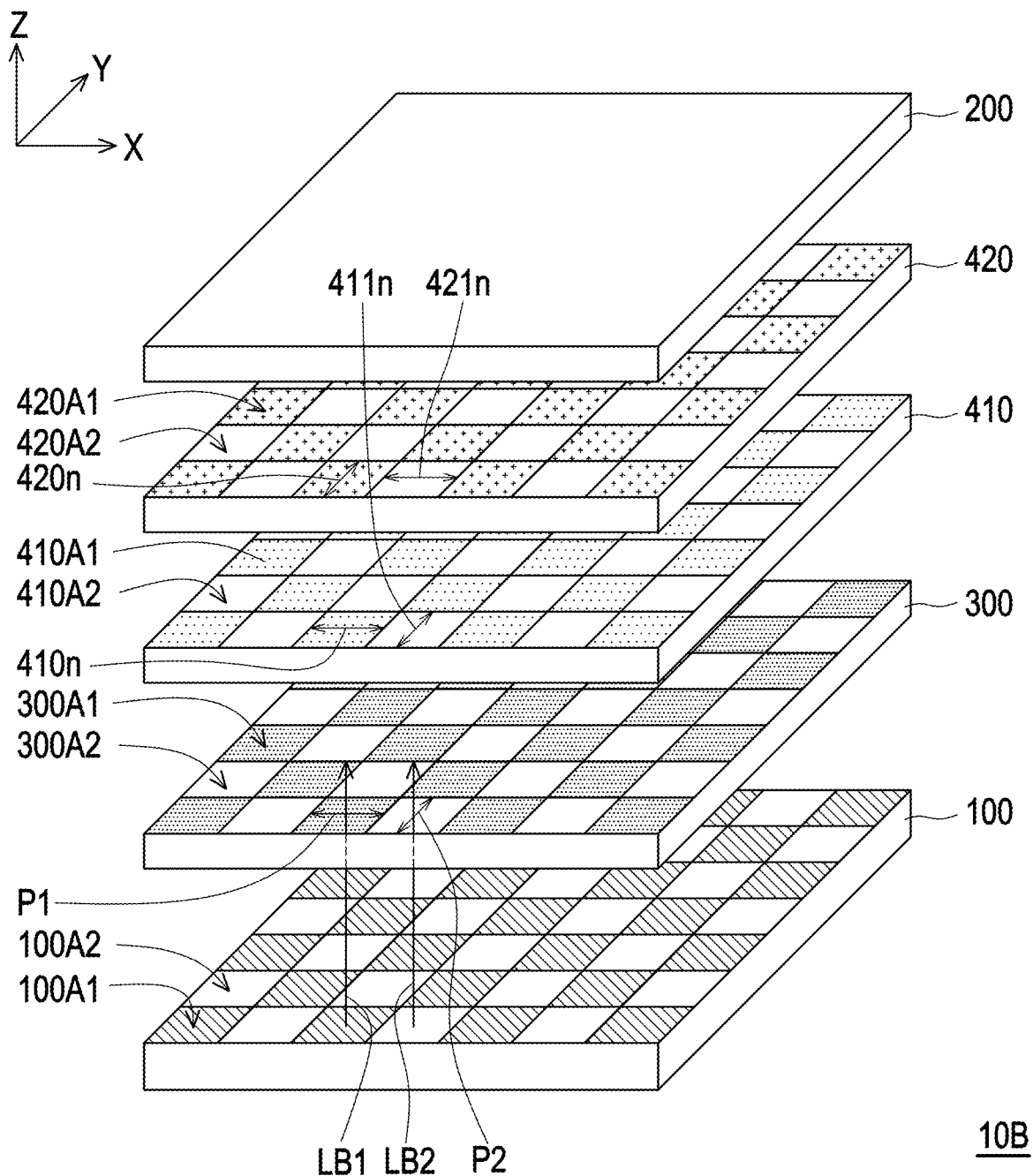
FIG. 8 is a schematic diagram of a display apparatus according to the third embodiment of the disclosure.
Figure 9A:
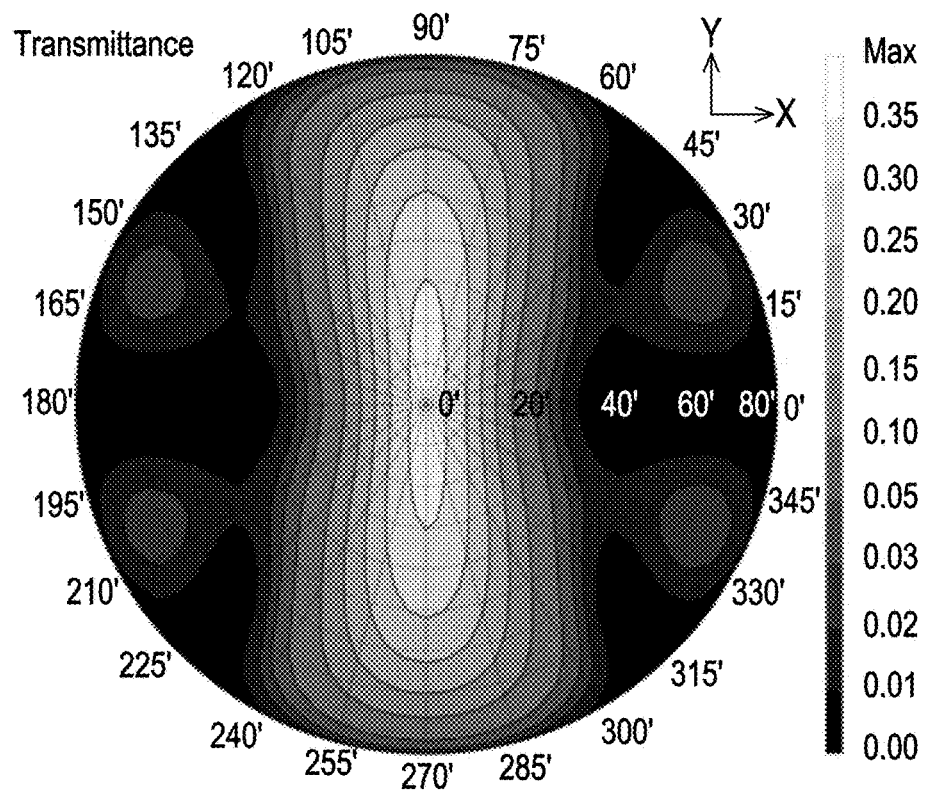
FIG. 9A to FIG. 9C are respectively distribution diagrams of transmission rates of the display apparatus of FIG. 8 under combinations of compensation films with different in-plane phase retardations.
Figure 9B:
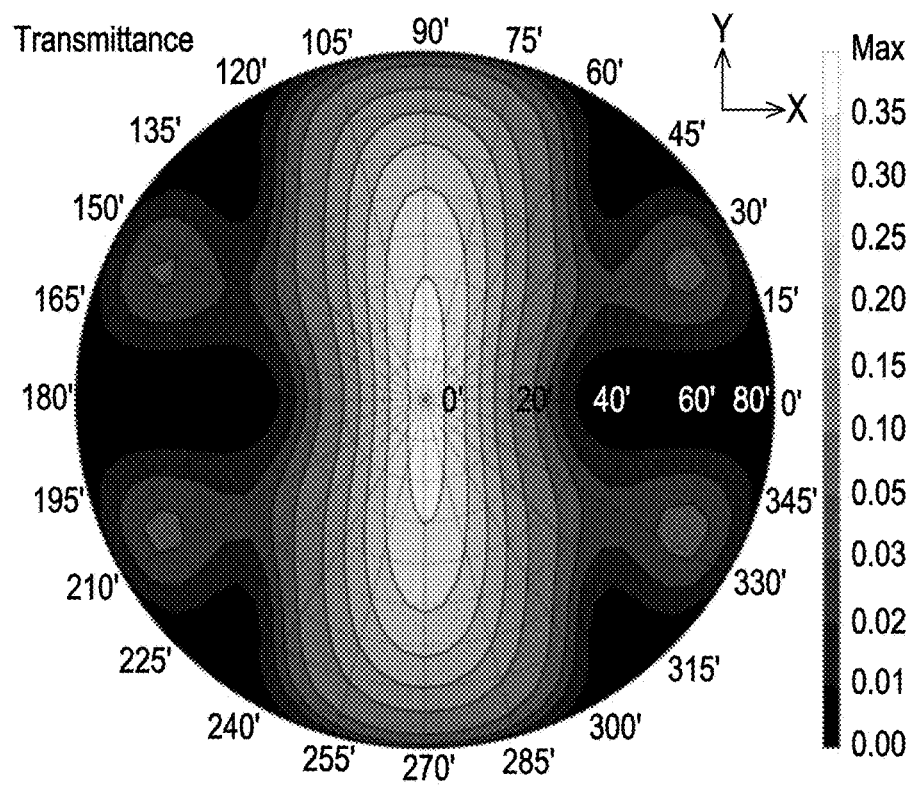
Figure 9C:
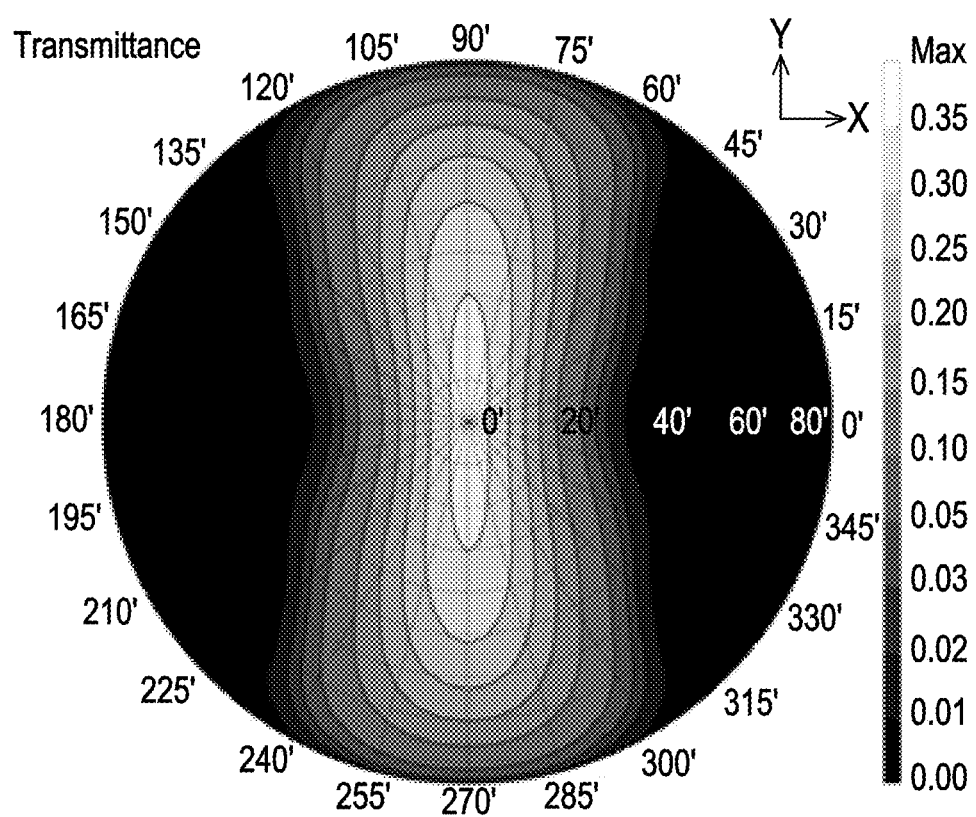

FIG. 8 is a schematic diagram of a display apparatus according to the third embodiment of the disclosure. FIG. 9A to FIG. 9C are respectively distribution diagrams of transmission rates of the display apparatus of FIG. 8 under combinations of compensation films with different in-plane phase retardations. With reference to FIG. 8, the difference between a display apparatus 10B of this embodiment and the display apparatus 10A of FIG. 6 lies in the number of compensation films. Specifically, the display apparatus 10B also includes another compensation film 420, disposed between the compensation film 410 and the viewing angle limiting device 200. In this embodiment, the in-plane phase retardation of the compensation film 410 and an in-plane phase retardation of the compensation film 420 may each be between one-quarter wavelength and one wavelength, and the in-plane phase retardations of the compensation film 410 and the compensation film 420 may be the same or different.

Notably, the compensation film 420 also includes a plurality of second partitions corresponding to the first regions 300A1 and the second regions 300A2 of the light polarization converter 300. That is, the partitions (i.e., the second partitions) of the compensation film 420 respectively correspond to the partitions (i.e., the first partitions) of the compensation film 410. An axial direction of an optical axis of the second partitions of the compensation film 420 is perpendicular to an axial direction of an optical axis of the corresponding first partitions of the compensation film 410. For example, in this embodiment, an axial direction of an optical axis 420n of the partitions (e.g., a partition 420A1) of the compensation film 420 corresponding to the first regions 300A1 is perpendicular to the first light polarization direction P1, and an axial direction of an optical axis 421n of the partitions (e.g., a partition 420A2) corresponding to the second regions 300A2 is perpendicular to the second light polarization direction P2. Through disposing the compensation film 410 and the compensation film 420 of which the axial directions of the optical axes are perpendicular to each other, an anti-peeping range of the display apparatus 10B of this embodiment is larger than the anti-peeping range of the display apparatus 10. Nonetheless, the disclosure is not limited thereto. In another embodiment, it is possible that the compensation film 410 and the compensation film 420 are not partitioned, the optical axis of the compensation film 410 is, for example, parallel to the first light polarization direction P1 (or parallel to the second light polarization direction P2), and the optical axis of the compensation film 410 is perpendicular to the optical axis of the compensation film 420 (i.e., the axial direction of the optical axis of the compensation film 420 being perpendicular to the first light polarization direction P1). In this way, an anti-peeping range of the light beam LB1 increases, and an anti-peeping range of the light beam LB2 decreases.

Furthermore, when the in-plane phase retardations of the compensation film 410 and the compensation film 420 are each one-half wavelength, the anti-peeping of the display apparatus 10B is increased in the directions at the azimuth angles of the 45 degrees and 315 degrees (as shown in FIG. 9A). When the in-plane phase retardations of the compensation film 410 and the compensation film 420 are respectively 220 nanometers and one-half wavelength, the anti-peeping range of the display apparatus 10B in the directions at the azimuth angles of 45 degrees and 315 degrees (as shown in FIG. 9B) is smaller than the anti-peeping range obtained by the combination of the compensation films of FIG. 9A. When the in-plane phase retardations of the compensation film 410 and the compensation film 420 are each 220 nanometers, the anti-peeping range of the display apparatus 10B in the directions at the azimuth angles of the 45 degrees and 315 degrees (as shown in FIG. 9C) is larger than the anti-peeping range obtained by the combination of the compensation films of FIG. 9A.

In particular, the display apparatus 10B of FIG. 8 is, for example, a small-sized mobile device such as a mobile phone or a tablet. The display apparatus 10B may be configured to meet the requirements of anti-peeping in the horizontal or vertical direction and sharing in a full viewing angle. For a large-sized display apparatus that only requires anti-peeping in the horizontal direction, such as laptops or desktop displays, it is possible that the compensation film 410 and the compensation film 420 of the display apparatus 10B are selected as compensation films without partition requirements, the optical axis of the compensation film 410 is parallel to the polarization direction of the light beam LB1, and the optical axis of the compensation film 420 is perpendicular to the polarization direction of the light beam LB1 (i.e., the optical axis of the compensation film 410 being perpendicular to the optical axis of the compensation film 420).

When the first display sub-regions 100A1 provide light beams and the second display sub-regions 100A2 do not provide light beams, the anti-peeping mode is exhibited in the horizontal direction, and when the first display sub-regions 100A1 and the second display sub-regions 100A2 provide light beams at the same time, the sharing mode is exhibited.

Figure 10:
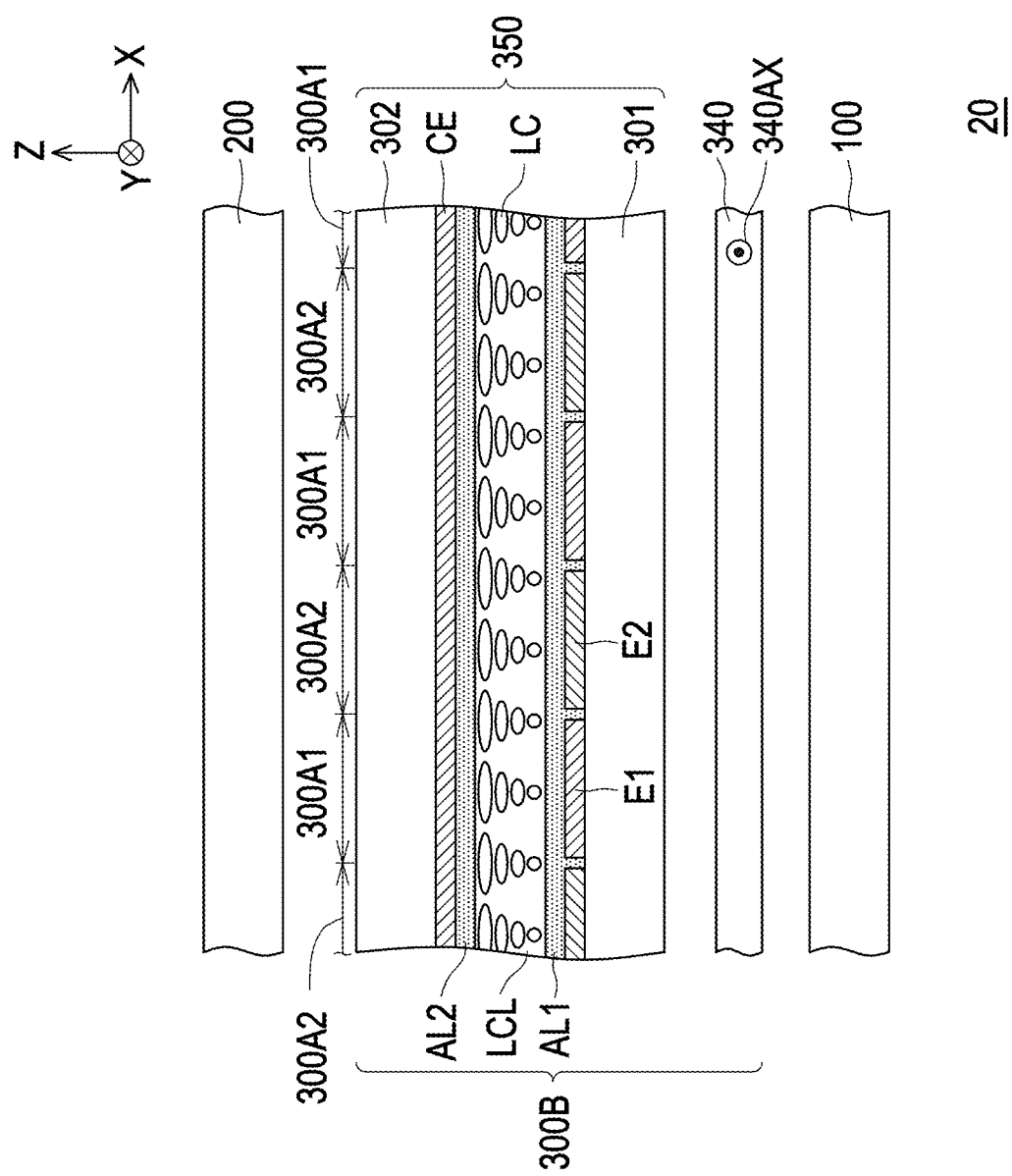
FIG. 10 is a schematic diagram of a display apparatus according to the fourth embodiment of the disclosure.
Figure 11:
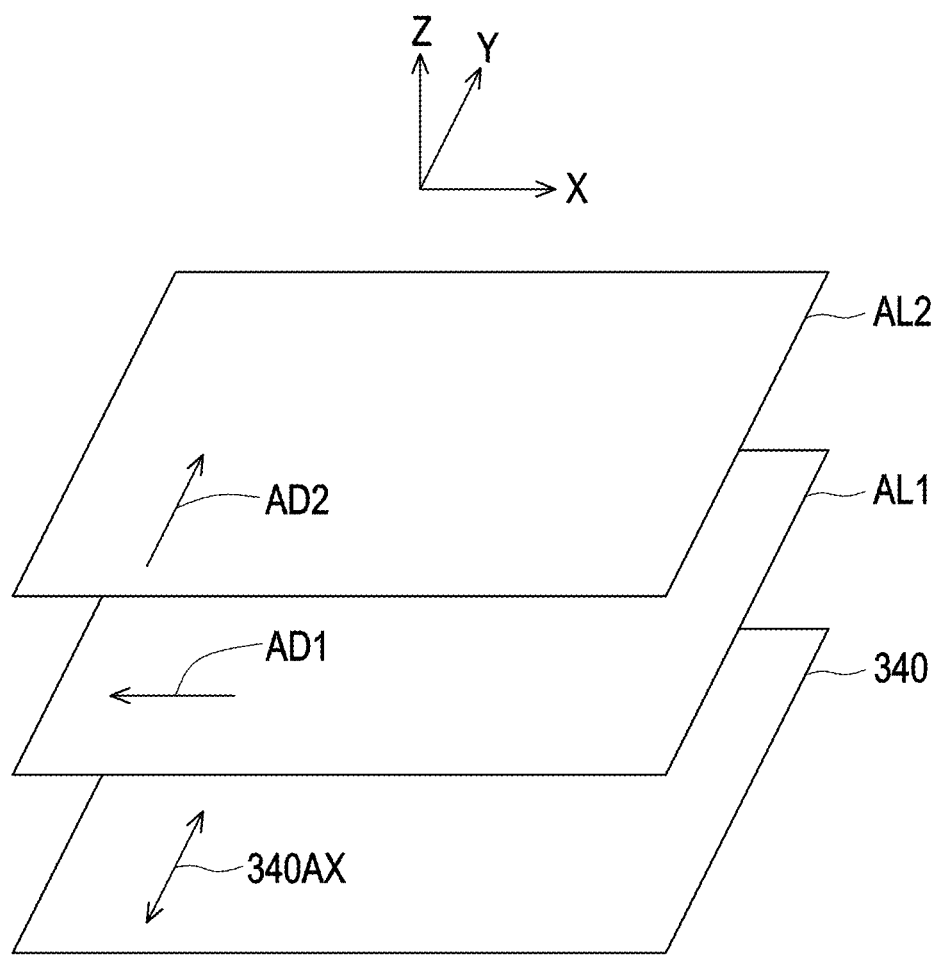
FIG. 11 is a schematic diagram of a part of film layers of the display apparatus of FIG. 10.
Figure 12A:
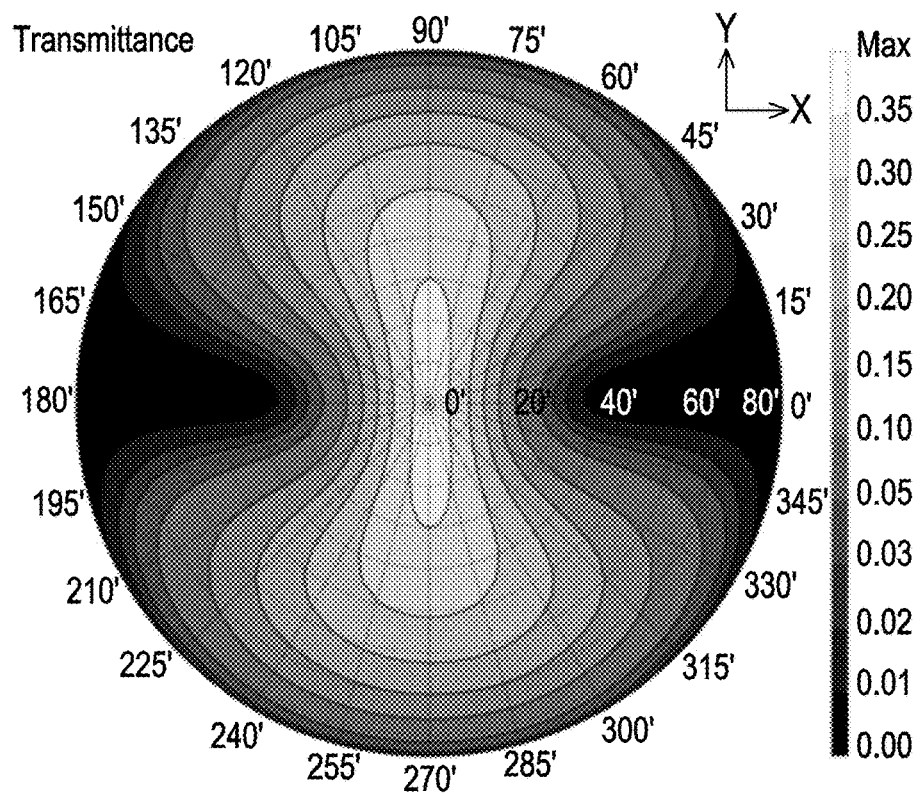
FIG. 12A and FIG. 12B are respectively distribution diagrams of transmission rates of the display apparatus of FIG. 10 operating in an anti-peeping mode and a sharing mode in a one-dimensional direction.
Figure 12B:
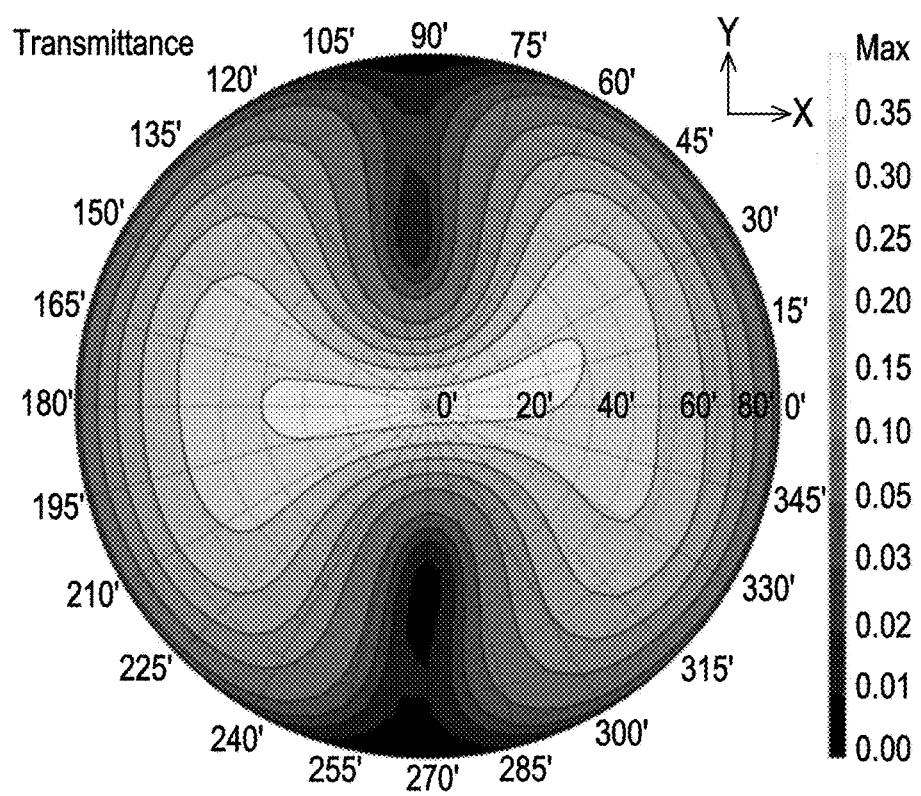

FIG. 10 is a schematic diagram of a display apparatus according to the fourth embodiment of the disclosure. FIG. 11 is a schematic diagram of a part of film layers of the display apparatus of FIG. 10. FIG. 12A and FIG. 12B are respectively distribution diagrams of transmission rates of the display apparatus of FIG. 10 operating in an anti-peeping mode and a sharing mode in a one-dimensional direction. With reference to FIG. 10, the difference between a display apparatus 20 of this embodiment and the display apparatus 10 of FIG. 1 lies in the composition of the light polarization converter. Specifically, a light polarization converter 300B of the display apparatus 20 includes a linear polarizer 340 and an electrically controlled viewing angle switcher 350, and the electrically controlled viewing angle switcher 350 is disposed between the linear polarizer 340 and the viewing angle limiting device 200.

For example, the electrically controlled viewing angle switcher 350 includes a first substrate 301, a second substrate 302, a first electrically conductive layer (e.g., a first electrode E1 and a second electrode E2), a second electrically conductive layer CE, and a liquid crystal layer LCL. The first electrically conductive layer and the second electrically conductive layer CE disposed opposite to each other respectively are disposed on the first substrate 301 and the second substrate 302. In this embodiment, the first electrode E1 and the second electrode E2 in the first electrically conductive layer are electrically insulated from each other, and the second electrically conductive layer CE is, for example, a whole-surface common electrode. Nonetheless, the disclosure is not limited thereto. In another embodiment, the first electrically conductive layer may also be a whole-surface electrode. In particular, the first electrode E1 and the second electrode E2 of the electrically controlled viewing angle switcher 350 respectively define the first region 300A1 and the second region 300A2 of the light polarization converter 300B.

The liquid crystal layer LCL is disposed between the first electrically conductive layer (e.g., the first electrode E1 and the second electrode E2) and the second electrically conductive layer CE, and includes the liquid crystal molecules LC. The materials of the first substrate 301 and the second substrate 302 include glass, quartz, organic polymer, or other suitable transparent materials. On the other hand, the first electrode E1, the second electrode E2, and the second electrically conductive layer CE are, for example, light-transmissive electrodes, and the materials of the light-transmitting electrodes include indium tin oxide, indium zinc oxide, aluminum tin oxide, aluminum zinc oxide, or other suitable oxides, extremely thin metals, metal mesh or wire grid, carbon nanotubes, Ag nano-wire, graphene, or a stacked layer of at least two of the above.

For example, when a voltage is applied between the first electrode E1 and the second electrically conductive layer CE (or the second electrode E2 and the second electrically conductive layer CE), the voltage forms an electric field between the two electrodes and drives the liquid crystal molecules LC of the liquid crystal layer LCL to rotate. In other words, an optical axis (or long axis) of the liquid crystal molecules LC is changed through different sizes and distributions of the electric field to adjust a polarization state of a light beam from the linear polarizer 340, and thereby the display apparatus 20 switches between the anti-peeping modes in different directions and the sharing mode with a full viewing angle.

In order for the optical axis of the liquid crystal molecules LC of the liquid crystal layer LCL to be aligned toward a specific direction without an external electric field (i.e., when no voltage is applied between the two electrically conductive layers, or there is no voltage difference between the two electrically conductive layers), the electrically controlled viewing angle switcher 350 also includes an alignment film AL1 and an alignment film AL2. The alignment film AL1 is disposed between the linear polarizer 340 and the liquid crystal layer LCL, the alignment film AL2 is disposed between the viewing angle limiting device 200 and the liquid crystal layer LCL, and the liquid crystal layer LCL is sandwiched between the alignment film AL1 and the alignment film AL2. With reference to FIG. 11 together, the alignment film AL1 and the alignment film AL2 respectively have an alignment direction AD1 and an alignment direction AD2. In this embodiment, the alignment direction AD1 is perpendicular to the direction Y, and the alignment direction AD2 is perpendicular to the direction X. That is, the alignment direction AD1 of the alignment film AL1 is substantially perpendicular to the alignment direction AD2 of the alignment film AL2. More specifically, the liquid crystal molecules LC of the liquid crystal layer LCL are aligned between two alignment films in twist deformation (TN). Nonetheless, the disclosure is not limited thereto. In another embodiment, liquid crystals of the electrically controlled viewing angle switcher 350 may also be horizontally aligned as electrically controlled birefringence (ECB) liquid crystals and sandwiched between the alignment film AL1 and the alignment film AL2.

Notably, in this embodiment, in the electrically controlled viewing angle switcher 350, the alignment direction AD1 of the alignment film AL1 that is closer to the linear polarizer 340 is perpendicular to an axial direction of an absorption axis 340AX of the linear polarizer 340, but it is not limited thereto. In another embodiment, in the electrically controlled viewing angle switcher, the alignment direction AD1 of the alignment film AL1 that is closer to the linear polarizer 340 may also be parallel to the axial direction of the absorption axis 340AX of the linear polarizer 340.

In particular, through disposing the electrically controlled viewing angle switcher 350, the display apparatus 20 switches between the anti-peeping modes in different directions without partition control of the display panel 100, or switches between the anti-peeping mode and the sharing mode in the same direction.

For example, when the display apparatus 20 is operating in the anti-peeping mode in the direction X, the first electrode E1 of the electrically controlled viewing angle switcher 350 is enabled (e.g., inputting a voltage different from the second electrically conductive layer CE), the second electrode E2 is not enabled (e.g., inputting the same voltage as the second electrically conductive layer CE). Therefore, the electric field formed between the first electrode E1 and the second electrically conductive layer CE drives a part of the liquid crystal molecules LC of the liquid crystal layer LCL overlapped with the first electrode E1 to rotate, such that an axial direction of the optical axis (or long molecular axis) is substantially parallel to a thickness direction of the liquid crystal layer LCL (e.g., the direction Z), and another part of the liquid crystal molecules LC of the liquid crystal layer LCL overlapped with the second electrode E2 still maintain in the original twist deformation.

At this time, after the light beam from the linear polarizer 340 passes through the first regions 300A1 of the light polarization converter 300B, its polarization direction will not be changed substantially. On the contrary, after the light beam from the linear polarizer 340 passes through the second regions 300A2 of the light polarization converter 300B, its polarization direction will be converted to be parallel to the axial direction of the absorption axis 340AX of the linear polarizer 340. Therefore, the display apparatus 20 is in the sharing mode in the Y direction, and in the anti-peeping mode in the direction X, and an anti-peeping range thereof is as shown in FIG. 12A.

On the other hand, when the display apparatus 20 is operating in the sharing mode in the direction X, the first electrode E1 of the electrically controlled viewing angle switcher 350 is not enabled, and the second electrode E2 is enabled. Therefore, the electric field formed between the second electrode E2 and the second electrically conductive layer CE drives the another part of the liquid crystal molecules LC of the liquid crystal layer LCL overlapped with the second electrode E2 to rotate, such that the axial direction of the optical axis (or long molecular axis) is substantially parallel to the thickness direction of the liquid crystal layer LCL (e.g., the direction Z), and the part of the liquid crystal molecules LC of the liquid crystal layer LCL overlapped with the first electrode E1 still maintain in the original twist deformation.

At this time, after the light beam from the linear polarizer 340 passes through the first regions 300A1 of the light polarization converter 300B, its polarization direction will be converted to be parallel to the axial direction of the absorption axis 340AX of the linear polarizer 340. On the contrary, after the light beam from the linear polarizer 340 passes through the second regions 300A2 of the light polarization converter 300B, its polarization direction will not be changed substantially. Therefore, the display apparatus 20 is in the sharing mode in the direction X, and is anti-peeping in the direction Y, and an anti-peeping range thereof is as shown in FIG. 12B.

Nonetheless, the disclosure is not limited thereto. When the display apparatus 20 is operating in the anti-peeping mode in the direction X (or operating in the sharing mode in the direction Y), the first electrode E1 and the second electrode E2 of the electrically controlled viewing angle switcher 350 may each also be enabled and have the same potential. At this time, after the light beam from the linear polarizer 340 passes through the first regions 300A1 and the second regions 300A2 of the light polarization converter 300B, its polarization direction will not be changed substantially. When the display apparatus 20 is operating in the sharing mode in the direction X (or operating in the anti-peeping mode in the direction Y), it is also possible that the first electrode E1 and the second electrode E2 of the electrically controlled viewing angle switcher 350 are neither enabled. At this time, after the light beam from the linear polarizer 340 passes through the first regions 300A1 and the second regions 300A2 of the light polarization converter 300B, its polarization direction will be converted to be parallel to the axial direction of the absorption axis 340AX of the linear polarizer 340.

It should be understood that, in other embodiments not shown, in the electrically controlled viewing angle switcher, the two electrically conductive layers located on the two opposite sides of the liquid crystal layer LCL may also be whole-surface electrodes. That is, the display apparatus may also adopt an electrically controlled viewing angle switcher without partition control to perform switching between anti-peeping modes in different directions.

Figure 13:
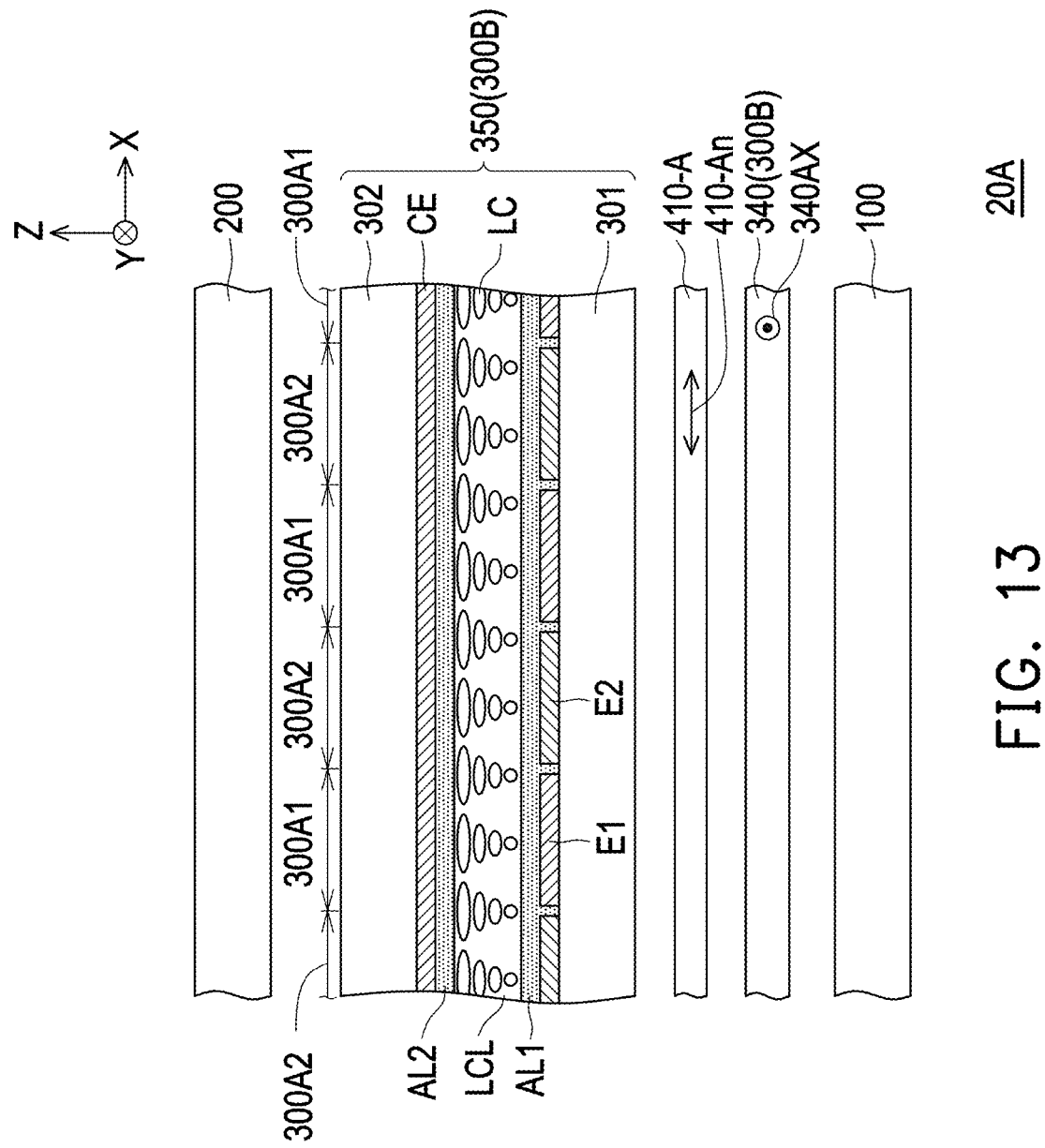
FIG. 13 is a schematic diagram of a display apparatus according to the fifth embodiment of the disclosure.
Figure 14A:
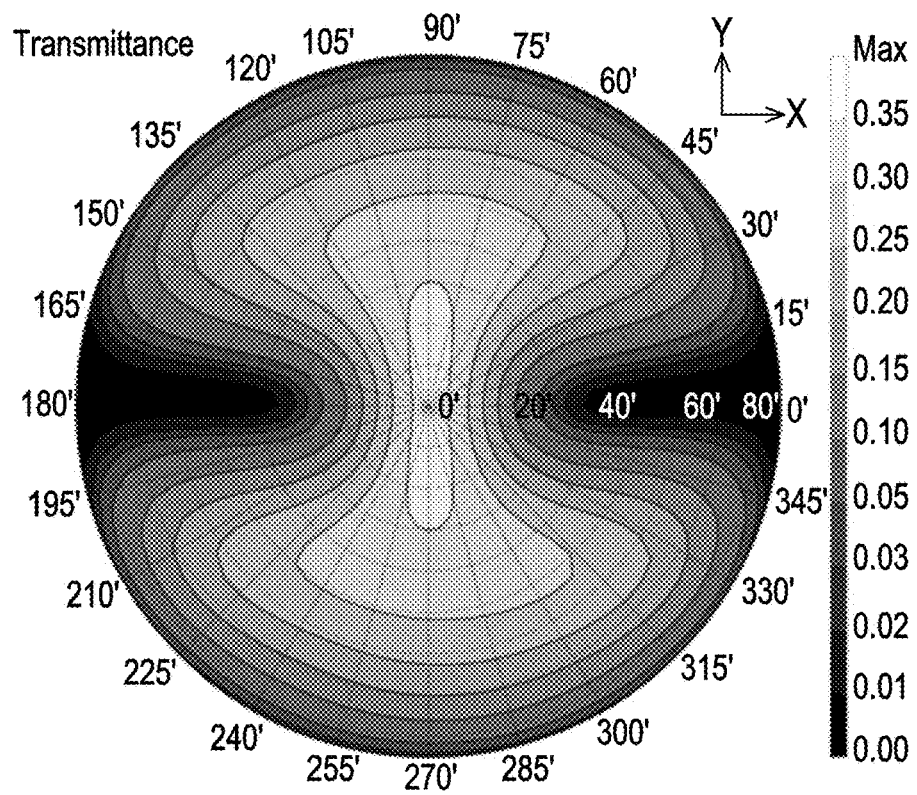
FIG. 14A and FIG. 14B are respectively distribution diagrams of transmission rate of the display apparatus of FIG. 13 operating in an anti-peeping mode and a sharing mode in a one-dimensional direction.
Figure 14B:
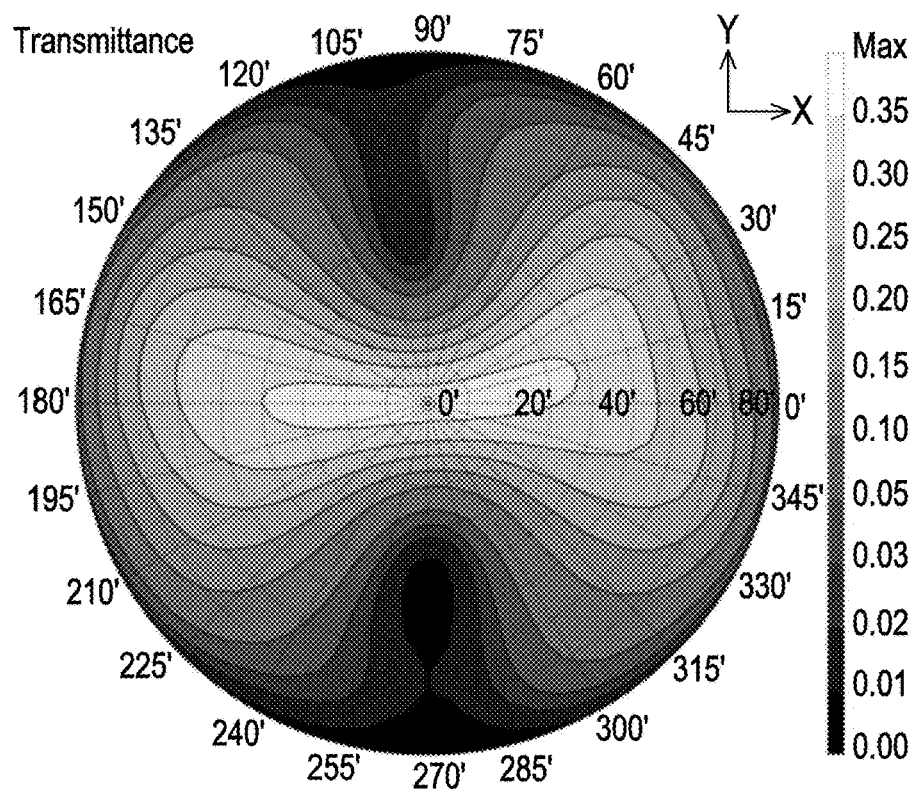

FIG. 13 is a schematic diagram of a display apparatus according to the fifth embodiment of the disclosure. FIG. 14A and FIG. 14B are respectively distribution diagrams of transmission rate of the display apparatus of FIG. 13 operating in an anti-peeping mode and a sharing mode in a one-dimensional direction. With reference to FIG. 13, the difference between a display apparatus 20A of this embodiment and the display apparatus 20 of FIG. 10 lies in that the display apparatus 20A also includes a compensation film 410-A, disposed between the electrically controlled viewing angle switcher 350 and the linear polarizer 340 of the light polarization converter 300B. Notably, an axial direction of an optical axis 410-An of the compensation film 410-A is perpendicular to the axial direction of the absorption axis 340AX of the linear polarizer 340, and does not have the partition characteristics as the compensation film 410 of FIG. 6.

In this embodiment, an in-plane phase retardation of the compensation film 410-A may be, for example but not limited to, one-half wavelength. In another embodiment, the in-plane phase retardation of the compensation film 410-A may also be between one-quarter wavelength and one wavelength. Through disposing the compensation film 410-A, an anti-peeping range of the display apparatus 20A (as shown in FIG. 14A) is smaller than the anti-peeping range of the display apparatus 20 (as shown in FIG. 12A), and a sharing range of the display apparatus 20A (as shown in FIG. 14B) is smaller than a sharing range of the display apparatus 20 (as shown in FIG. 12B).

Figure 15:
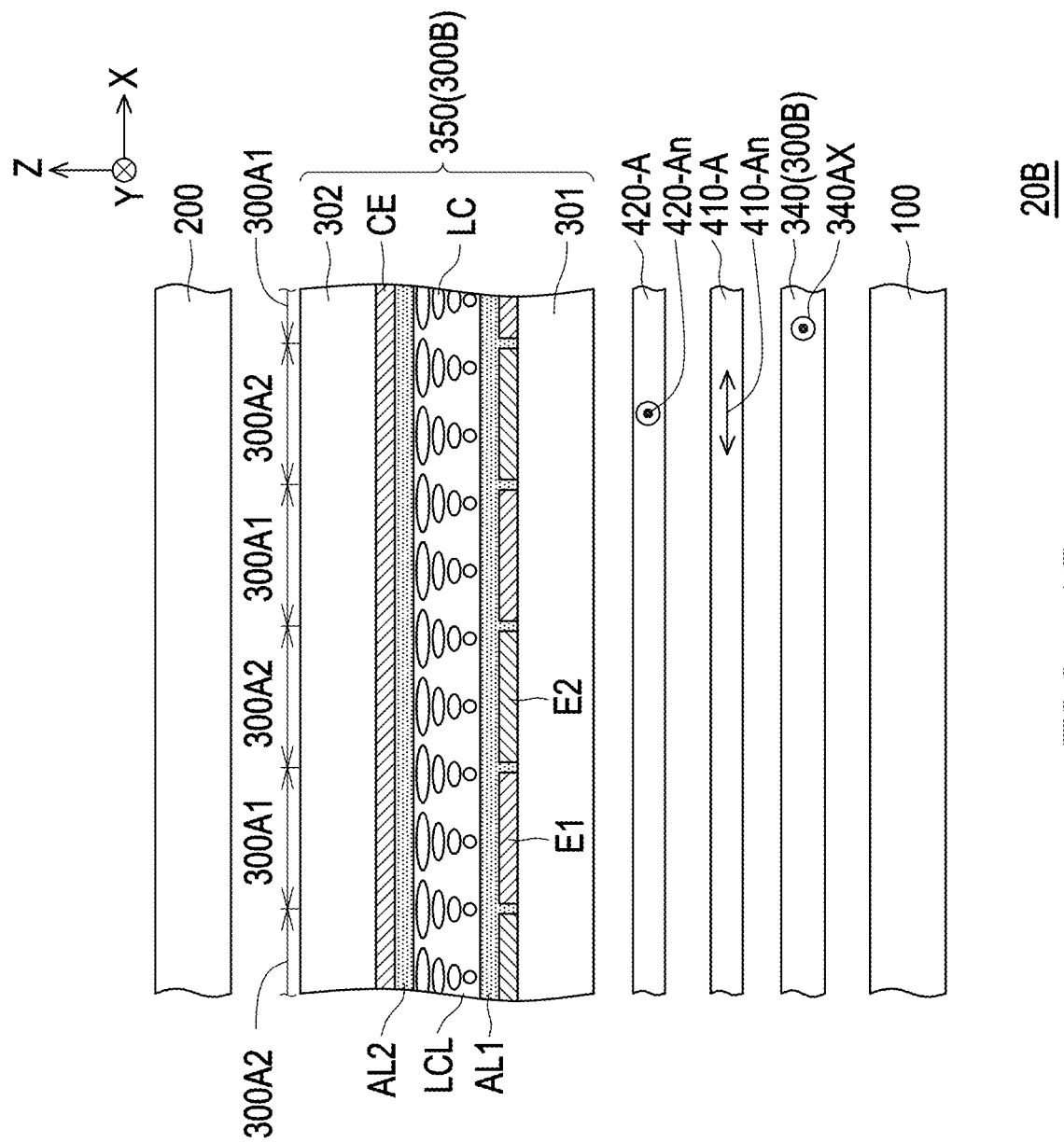
FIG. 15 is a schematic diagram of a display apparatus according to the sixth embodiment of the disclosure.
Figure 16A:
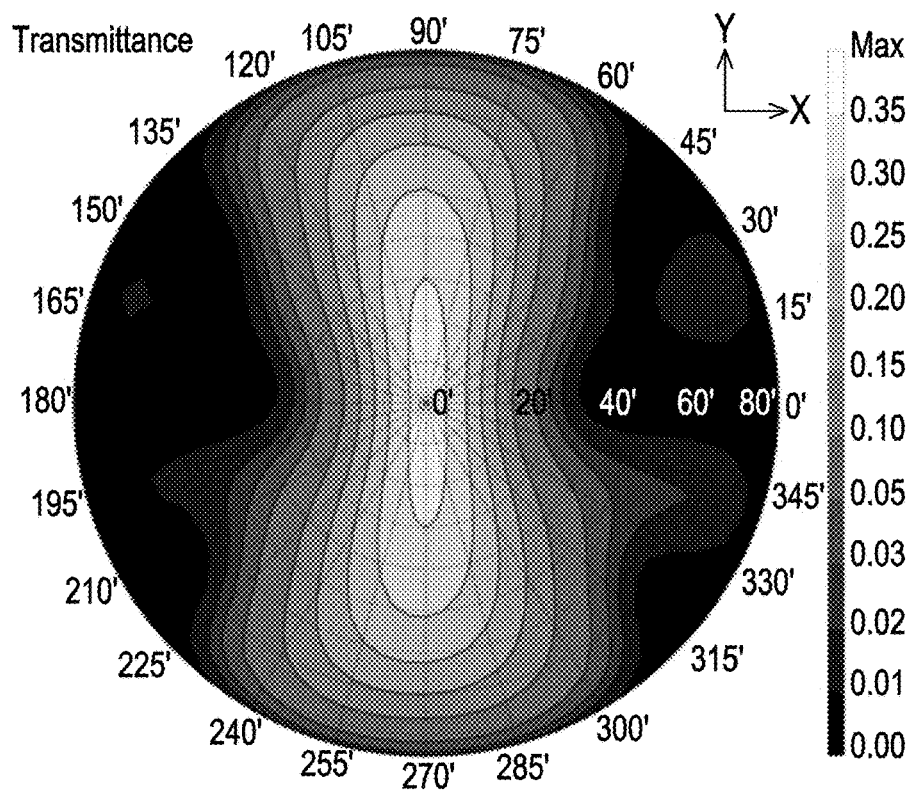
FIG. 16A and FIG. 16B are respectively distribution diagrams of transmission rates of the display apparatus of FIG. 15 operating in an anti-peeping mode and a sharing mode in a one-dimensional direction.
Figure 16B:
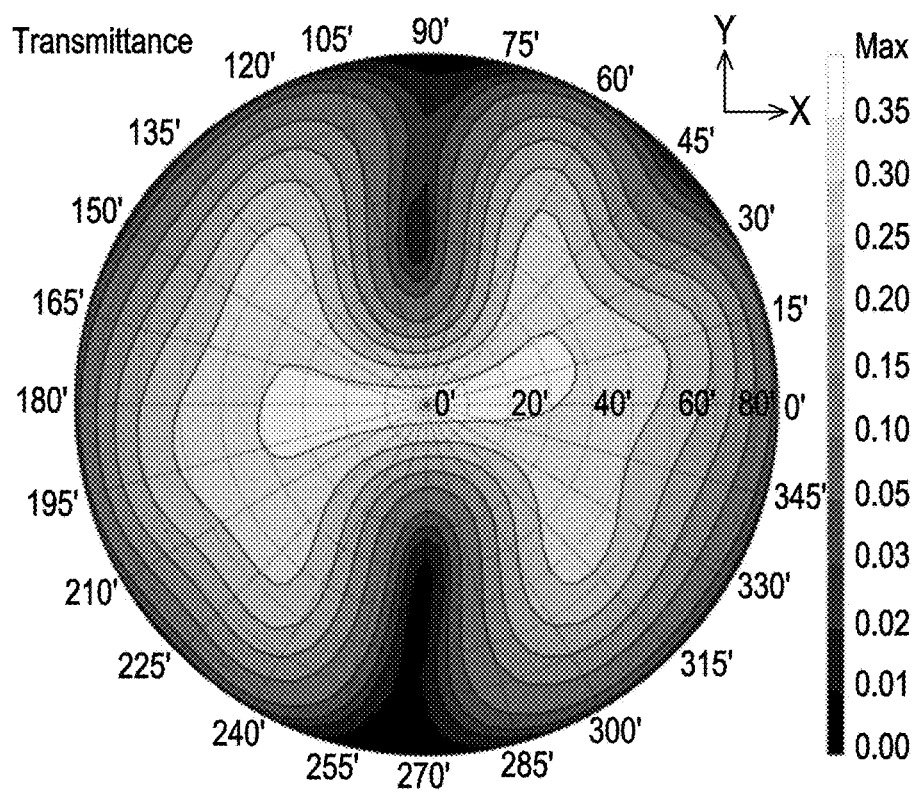

FIG. 15 is a schematic diagram of a display apparatus according to the sixth embodiment of the disclosure. FIG. 16A and FIG. 16B are respectively distribution diagrams of transmission rates of the display apparatus of FIG. 15 operating in an anti-peeping mode and a sharing mode in a one-dimensional direction. With reference to FIG. 15, the difference between the display apparatus 20B of this embodiment and the display apparatus 20A of FIG. 13 lies in the number of the compensation films. In this embodiment, the display apparatus 20B also includes another compensation film 420-A, disposed between the viewing angle limiting device 200 and the compensation film 410-A, for example, disposed between the electrically controlled viewing angle switcher 350 and the compensation film 410-A. An axial direction of an optical axis 420-An of the compensation film 420-A is parallel to the axial direction of the absorption axis 340AX of the linear polarizer 340, and does not have the partition characteristics as the compensation film 420 of FIG. 8.

In this embodiment, the in-plane phase retardation of the compensation film 410-A and an in-plane phase retardation of the compensation film 420-A may be, for example but not limited to, one-half wavelength. In another embodiment, the in-plane phase retardation of at least one of the compensation film 410-A and the compensation film 420-A may also be between one-quarter wavelength and one wavelength. Different from the compensation film 410-A configured to reduce the anti-peeping range and the sharing range of the display apparatus 20A, in this embodiment, the combination of the compensation film 410-A and the compensation film 420-A further increases an anti-peeping range and a sharing range of the display apparatus 20B. For example, the anti-peeping range of the display apparatus 20B (as shown in FIG. 16A) is larger than the anti-peeping range of the display apparatus 20, and the sharing range of the display apparatus 20B (as shown in FIG. 16B) is larger than the sharing range of the display apparatus 20.

Figure 17:
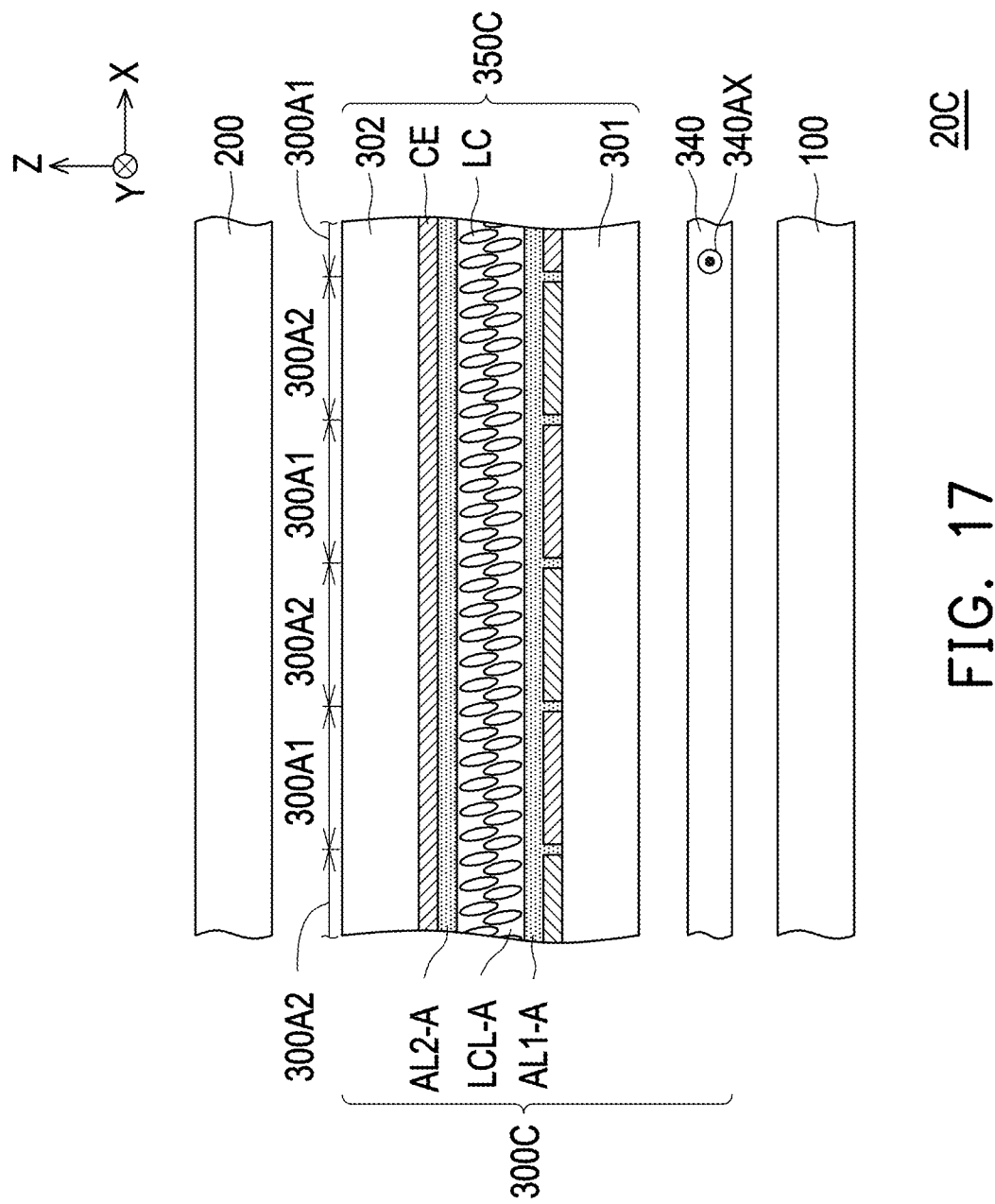
FIG. 17 is a schematic diagram of a display apparatus according to the seventh embodiment of the disclosure.
Figure 18:
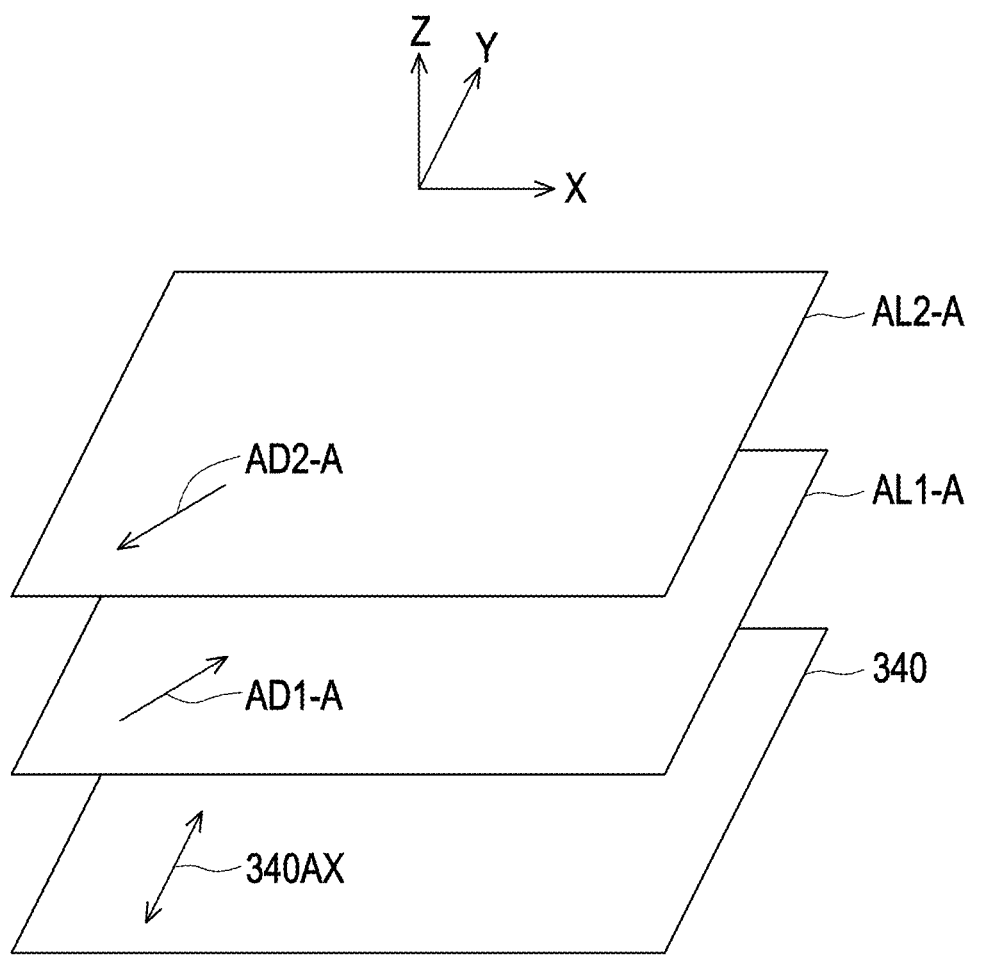
FIG. 18 is a schematic diagram of a part of film layers of the display apparatus of FIG. 17.
Figure 19A:
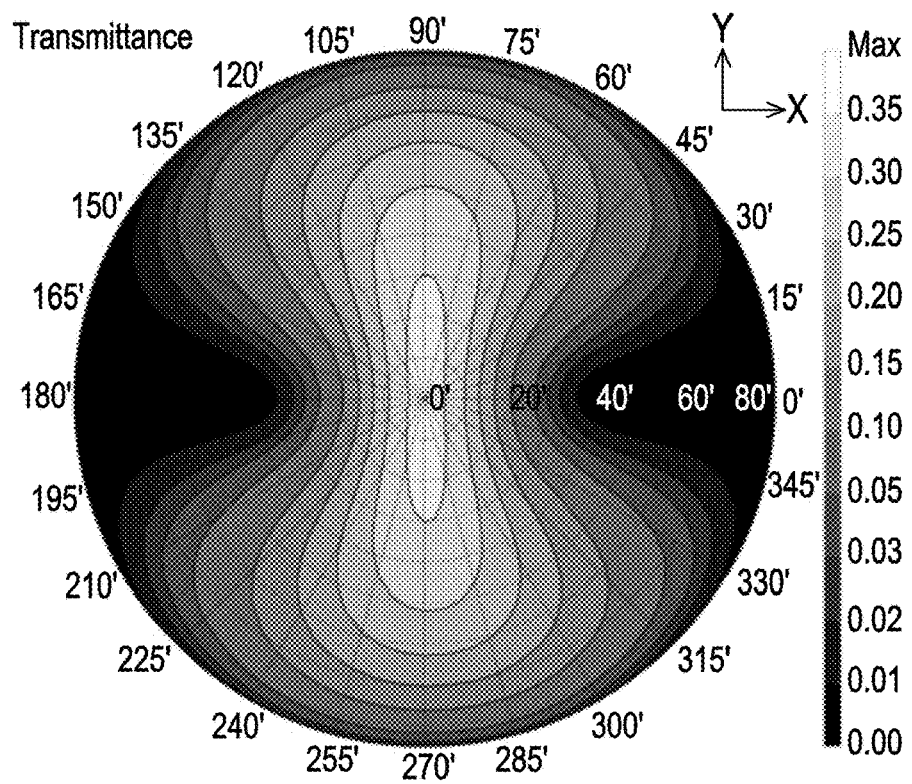
FIG. 19A and FIG. 19B are respectively distribution diagrams of transmission rates of the display apparatus of FIG. 17 operating in an anti-peeping mode and a sharing mode in a one-dimensional direction.
Figure 19B:
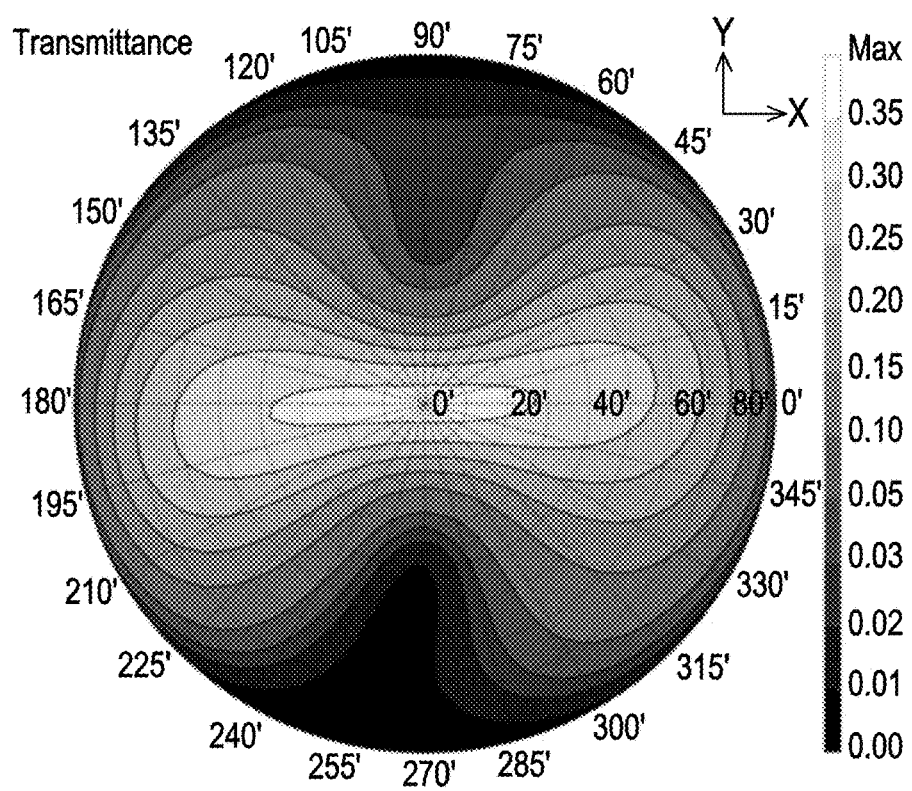

FIG. 17 is a schematic diagram of a display apparatus according to the seventh embodiment of the disclosure. FIG. 18 is a schematic diagram of a part of film layers of the display apparatus of FIG. 17. FIG. 19A and FIG. 19B are respectively distribution diagrams of transmission rates of the display apparatus of FIG. 17 operating in an anti-peeping mode and a sharing mode in a one-dimensional direction. With reference to FIG. 17, the difference between a display apparatus 20C of this embodiment and the display apparatus 20 of FIG. 10 lies in the alignment of the liquid crystal layer of the electrically controlled viewing angle switcher. Specifically, the liquid crystal molecules LC of an electrically controlled viewing angle switcher 350C of the display apparatus 20C is substantially sandwiched in a vertical alignment (VA) between an alignment film AL1-A and an alignment film AL2-A.

It should be understood that in order for the liquid crystal molecules LC of a liquid crystal layer LCL-A to form a single-region alignment, most alignment films configured for vertical alignment still need to be aligned, such as rubbing alignment or photo alignment. Therefore, the alignment film herein may have a pretilt angle of 85 degrees, but it is not limited thereto. In another embodiment, the liquid crystals of the electrically controlled viewing angle switcher 350C may also be in a horizontal alignment, such as through electrically controlled birefringence (ECB), and the pretilt angle may be 5 degrees. With reference to FIG. 17 and FIG. 18 together, in this embodiment, an alignment direction AD1-A of the alignment film AL1-A is anti-parallel to an alignment direction AD2-A of the alignment film AL2-A, and an angle between the alignment direction AD1-A of the alignment film AL1-A and the absorption axis 340AX of the polarizer 340 is 45 degrees.

For example, when the display apparatus 20C is operating in the anti-peeping mode in the direction X (or operating in the sharing mode in the direction Y), the first electrode E1 and the second electrode E2 of the electrically controlled viewing angle switcher 350C are neither enabled. Therefore, the liquid crystal molecules LC of the liquid crystal layer LCL-A still maintain in the original vertical alignment. At this time, after the light beam from the linear polarizer 340 passes through the first regions 300A1 and the second regions 300A2 of a light polarization converter 300C, its polarization direction will not be changed substantially.

When the display apparatus 20C is operating in the sharing mode in the direction X (or operating in the anti-peeping mode in the direction Y), the first electrode E1 and the second electrode E2 of the electrically controlled viewing angle switcher 350C are each enabled and have the same potential. At this time, the electric field formed between the first electrically conductive layer and the second electrically conductive layer CE drives the liquid crystal molecules LC of the liquid crystal layer LCL-A to rotate, such that the axial direction of the optical axis (or long molecular axis) deviates from the thickness direction of the liquid crystal layer LCL (e.g., the direction Z) in different degrees. Therefore, after the light beam from the linear polarizer 340 passes through the first regions 300A1 and the second regions 300A2 of the light polarization converter 300C, its polarization direction will be converted to be parallel to the axial direction of the absorption axis 340AX of the linear polarizer 340.

Notably, when the display apparatus 20C of this embodiment is operating in the anti-peeping mode in the direction X, an anti-peeping range thereof (as shown in FIG. 19A) is larger than the anti-peeping range of the display apparatus 20 of FIG. 10 (as shown in FIG. 12A). When the display apparatus 20C is operating in the sharing mode in the direction X, a sharing range thereof (as shown in FIG. 19B) is smaller than the sharing range of the display apparatus of FIG. 10 (as shown in FIG. 12B).

Figure 20:
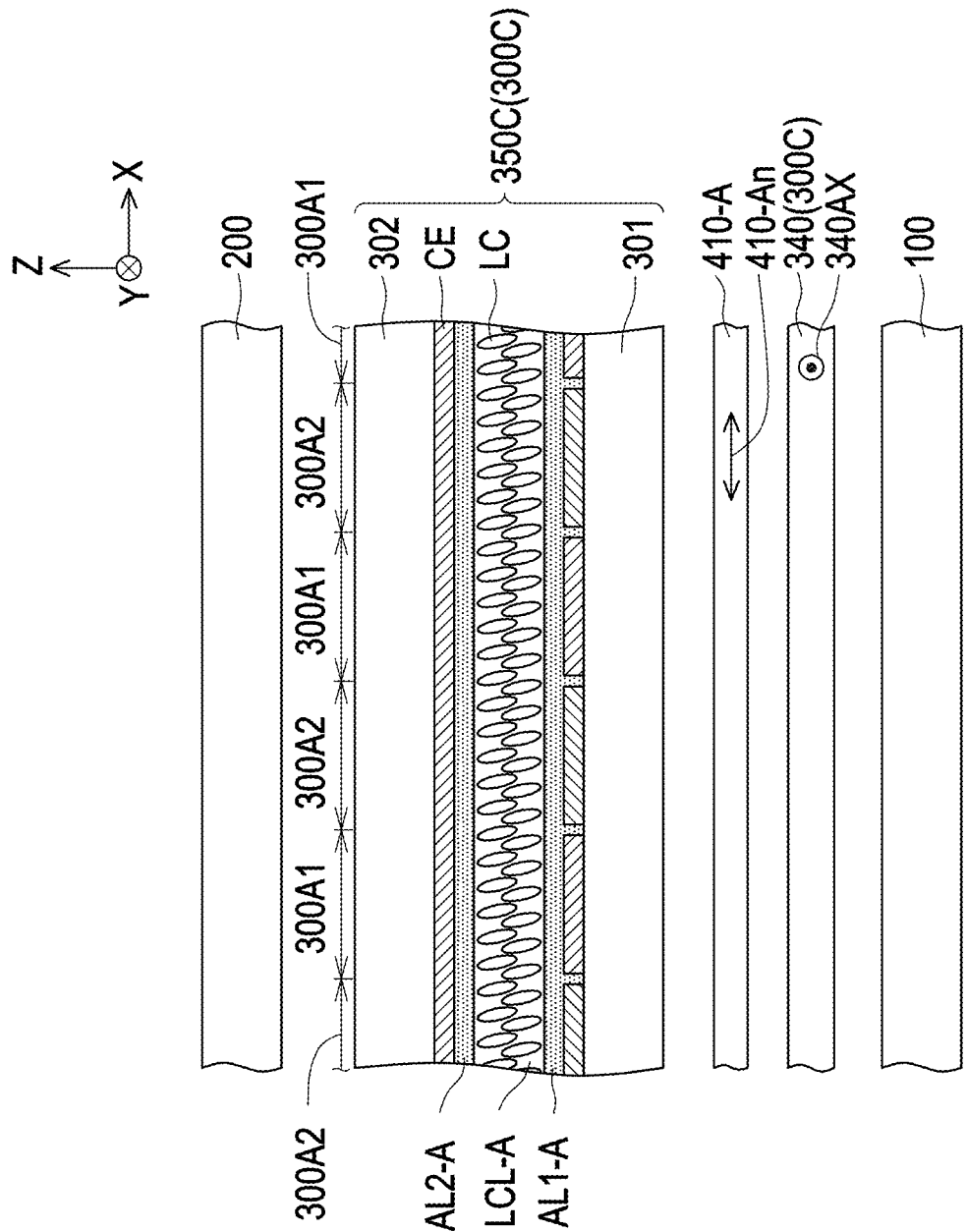
FIG. 20 is a schematic diagram of a display apparatus according to the eighth embodiment of the disclosure.
Figure 21A:
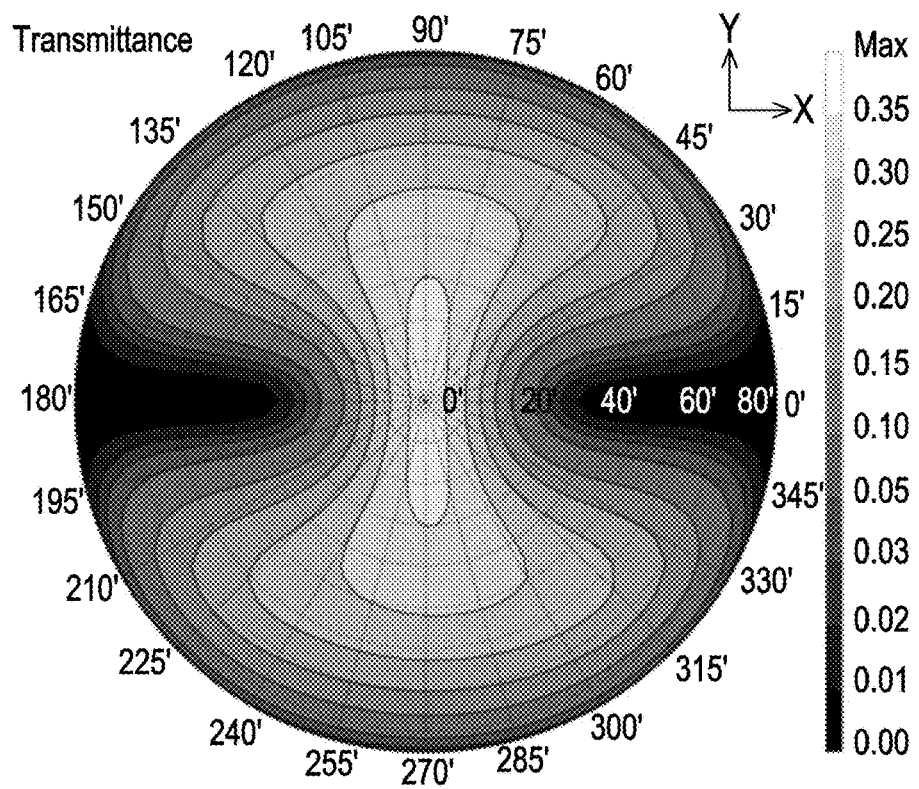
FIG. 21A and FIG. 21B are respectively distribution diagrams of transmission rates of the display apparatus of FIG. 20 operating in an anti-peeping mode and a sharing mode in a one-dimensional direction.
Figure 21B:
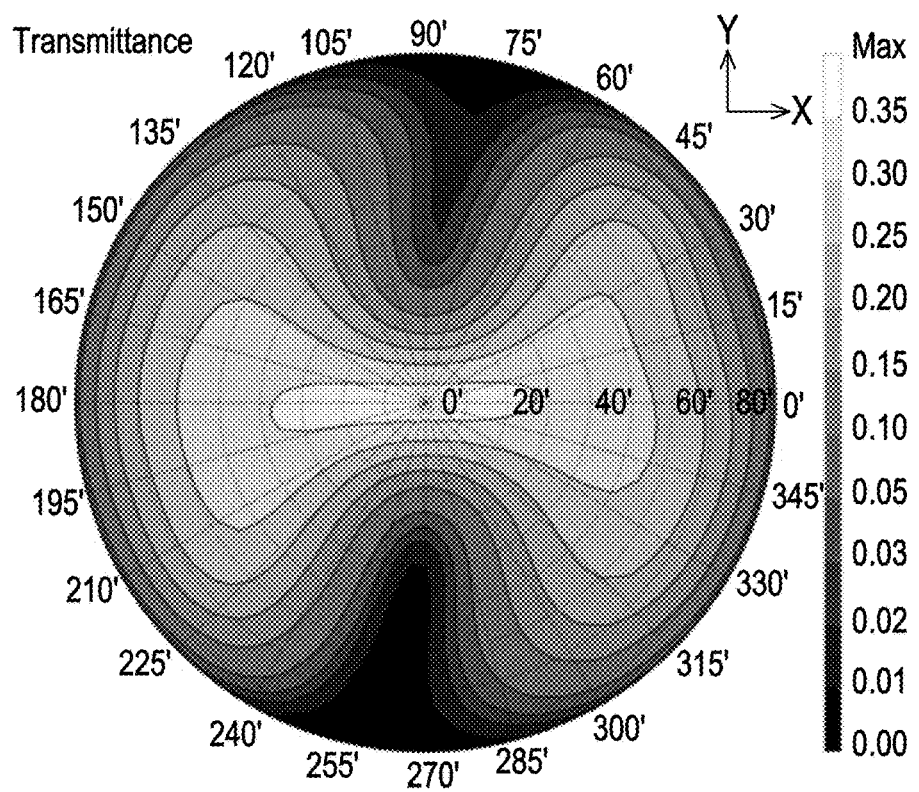

FIG. 20 is a schematic diagram of a display apparatus according to the eighth embodiment of the disclosure. FIG. 21A and FIG. 21B are respectively distribution diagrams of transmission rates of the display apparatus of FIG. 20 operating in an anti-peeping mode and a sharing mode in a one-dimensional direction. With reference to FIG. 20, the difference between a display apparatus 20D of this embodiment and the display apparatus 20C of FIG. 17 lies in that the display apparatus 20D also includes the compensation film 410-A, disposed between the electrically controlled viewing angle switcher 350C and the linear polarizer 340 of the light polarization converter 300C. Notably, the axial direction of the optical axis 410-An of the compensation film 410-A is perpendicular to the axial direction of the absorption axis 340AX of the linear polarizer 340, and does not have the partition characteristics as the compensation film 410 of FIG. 6.

In this embodiment, the in-plane phase retardation of the compensation film 410-A may be, for example but not limited to, one-half wavelength. In another embodiment, the in-plane phase retardation of the compensation film 410-A may also be between one-quarter wavelength and one wavelength. Through disposing the compensation film 410-A, an anti-peeping range of the display apparatus 20D (e.g., FIG. 21A) is smaller than the anti-peeping range of the display apparatus 20C (e.g., FIG. 19A), and a sharing range of the display apparatus 20D (e.g., FIG. 21B) is larger than the sharing range of the display apparatus 20C (e.g., FIG. 19B).

Figure 22:
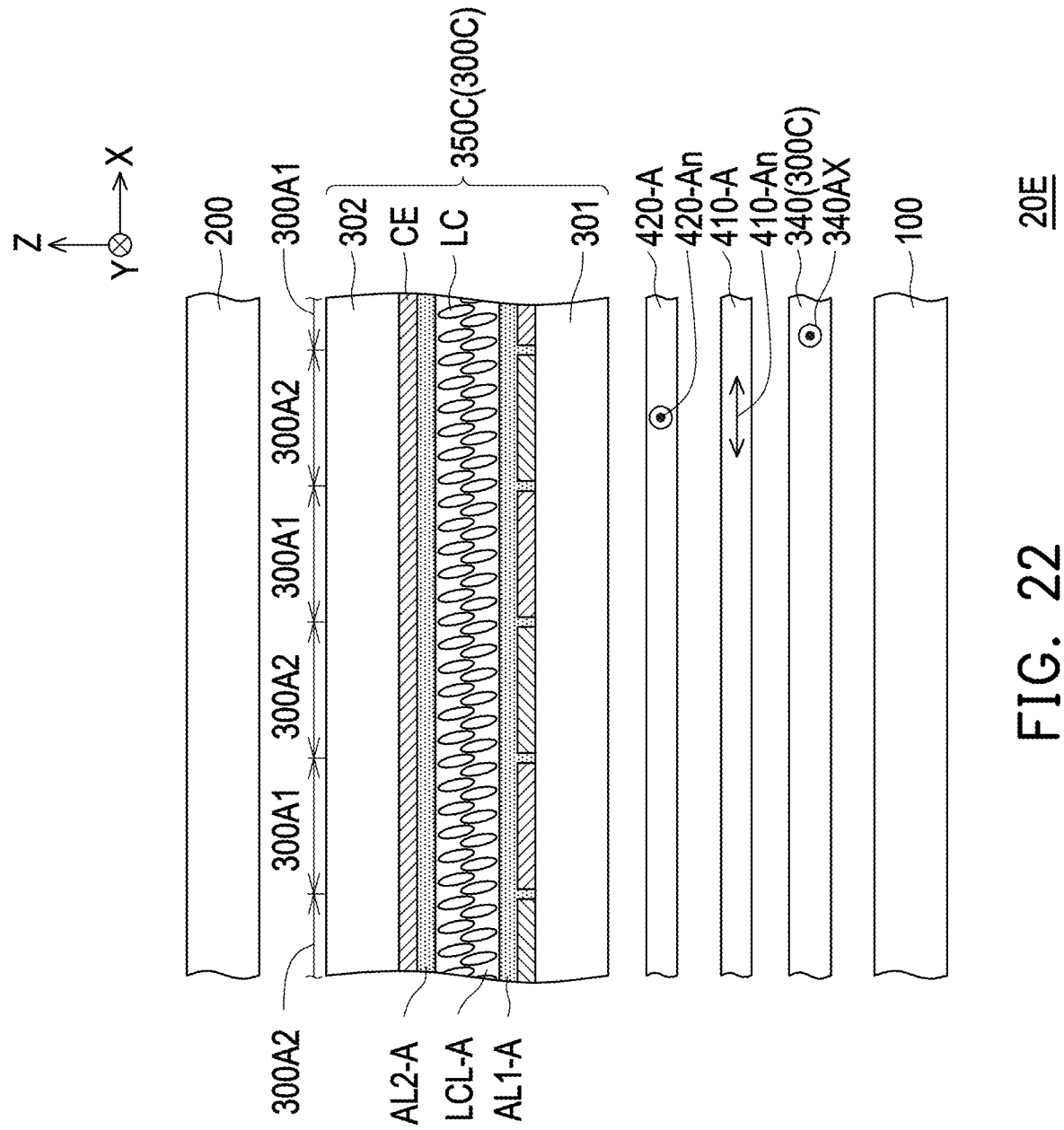
FIG. 22 is a schematic diagram of a display apparatus according to the ninth embodiment of the disclosure.
Figure 23A:
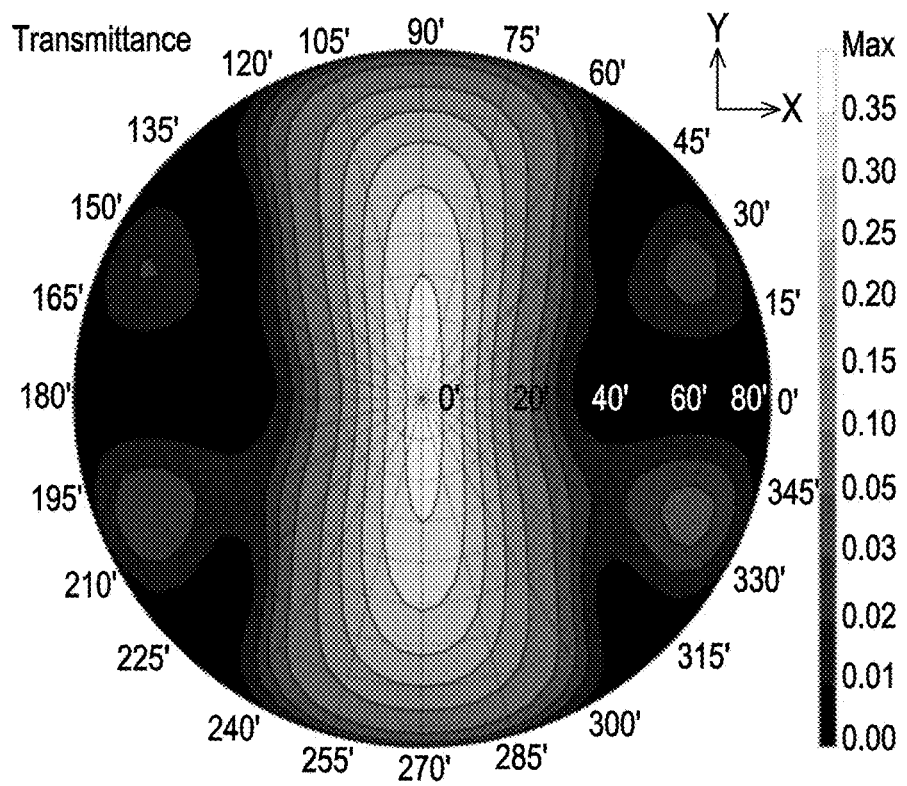
FIG. 23A and FIG. 23B are respectively distribution diagrams of transmission rates of the display apparatus of FIG. 22 operating in an anti-peeping mode and a sharing mode in a one-dimensional direction.
Figure 23B:
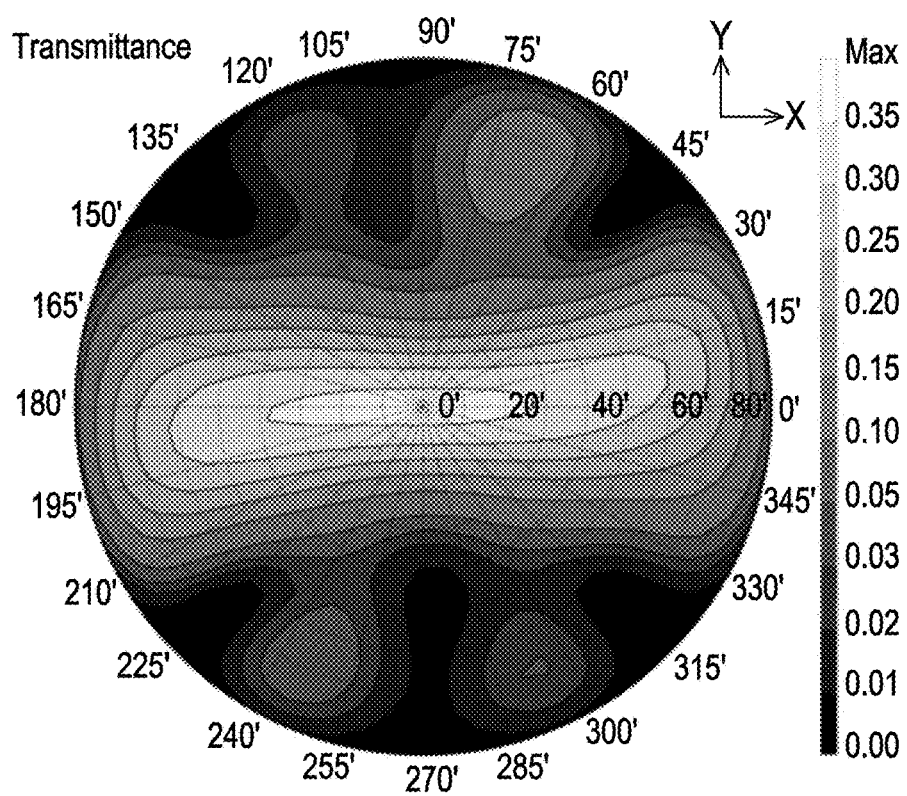

FIG. 22 is a schematic diagram of a display apparatus according to the ninth embodiment of the disclosure. FIG. 23A and FIG. 23B are respectively distribution diagrams of transmission rates of the display apparatus of FIG. 22 operating in an anti-peeping mode and a sharing mode in a one-dimensional direction. With reference to FIG. 22, the difference between a display apparatus 20E of this embodiment and the display apparatus 20D of FIG. 20 lies in the number of the compensation films. In this embodiment, the display apparatus 20E also includes the another compensation film 420-A, disposed between the electrically controlled viewing angle switcher 350C and the compensation film 410-A, and the axial direction of the optical axis 420-An of the compensation film 420-A is parallel to the axial direction of the absorption axis 340AX of the linear polarizer 340.

In this embodiment, the in-plane phase retardations of the compensation film 410-A and the compensation film 420-A may be, for example but not limited to, one-half wavelength. In another embodiment, the in-plane phase retardation of at least one of the compensation film 410-A and the compensation film 420-A may also be between one-quarter wavelength and one wavelength. Different from the compensation film 410-A configured to reduce the anti-peeping range of the display apparatus 20D and increase the sharing range of the display apparatus 20D, in this embodiment, through disposing the compensation film 410-A and the compensation film 420-A, an anti-peeping range of the display apparatus 20E is increased and a sharing range of the display apparatus 20E is reduced. For example, the anti-peeping range of the display apparatus 20E (as shown in FIG. 23A) is larger than the anti-peeping range of the display apparatus 20D (as shown in FIG. 21A), and the sharing range of the display apparatus 20E (as shown in FIG. 23B) is smaller than the sharing range of the display apparatus 20D (as shown in FIG. 21B).

Figure 24:
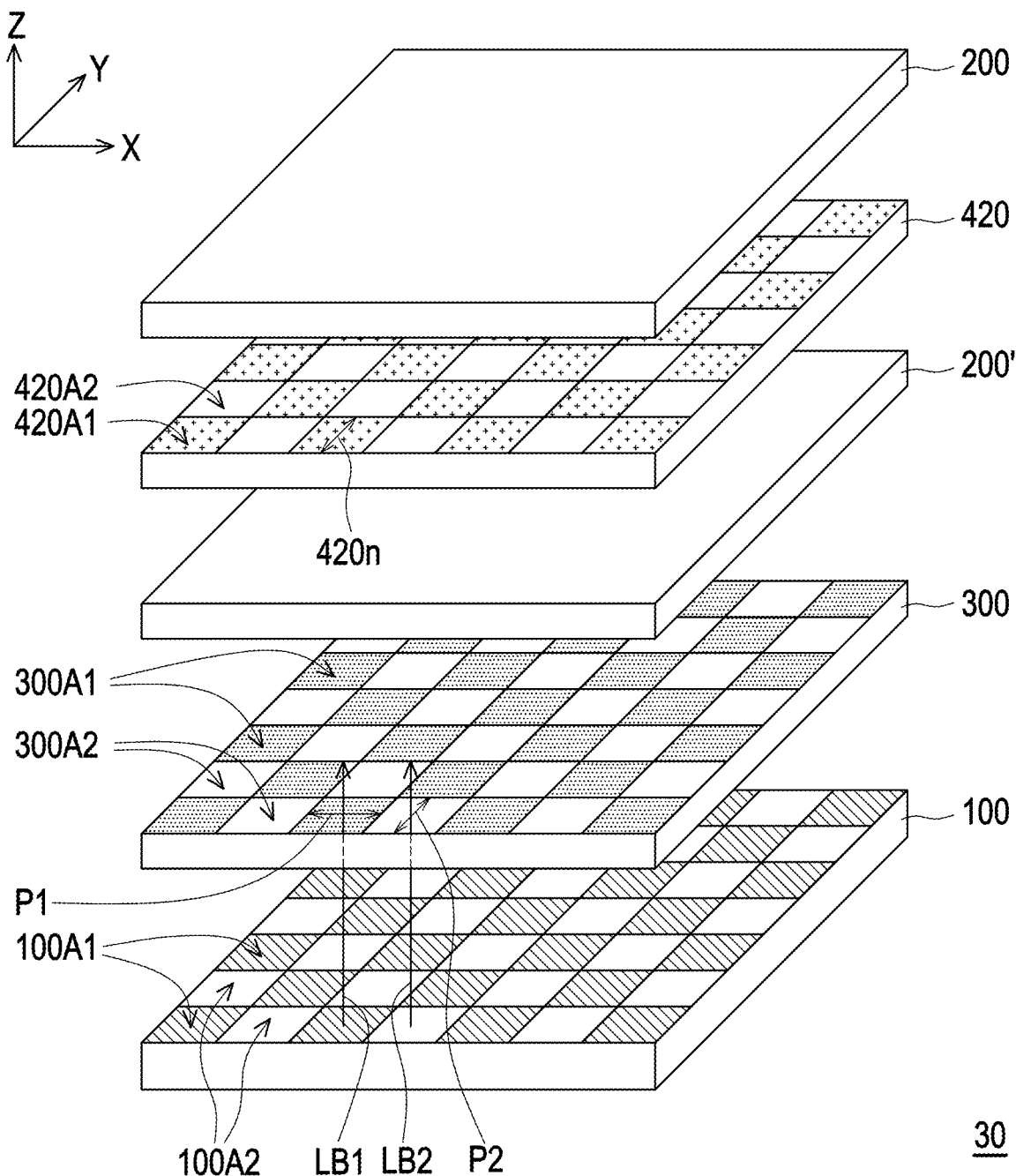
FIG. 24 is a schematic diagram of a display apparatus according to the tenth embodiment of the disclosure.
Figure 25A:
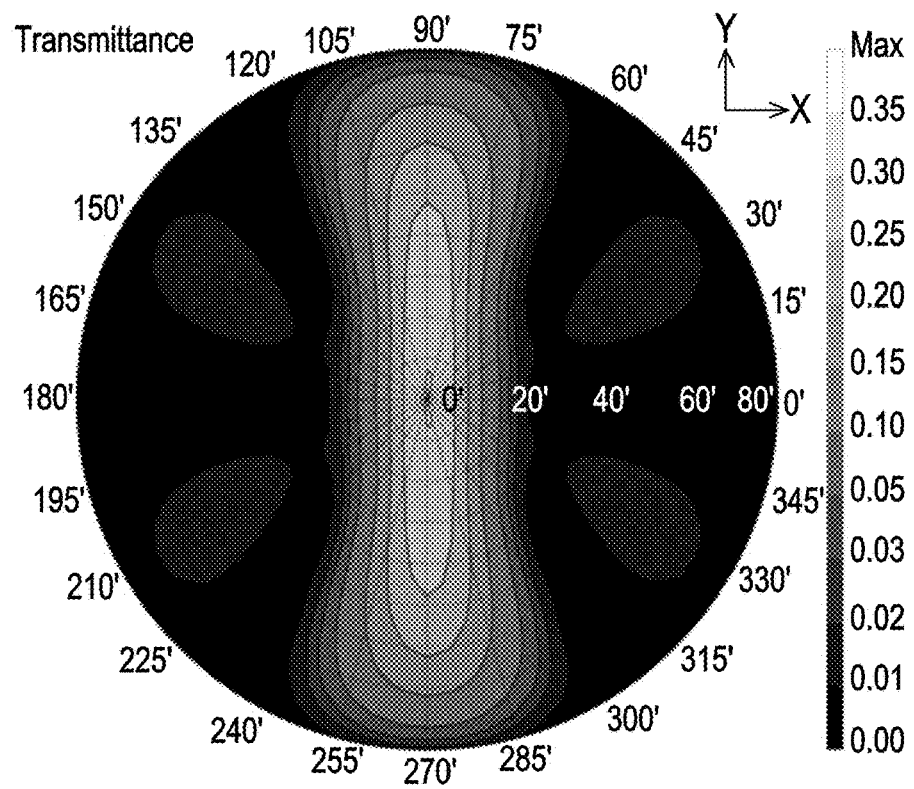
FIG. 25A to FIG. 25C are respectively distribution diagrams of transmission rates of the display apparatus of FIG. 24 under compensation films with different in-plane phase retardations.
Figure 25B:
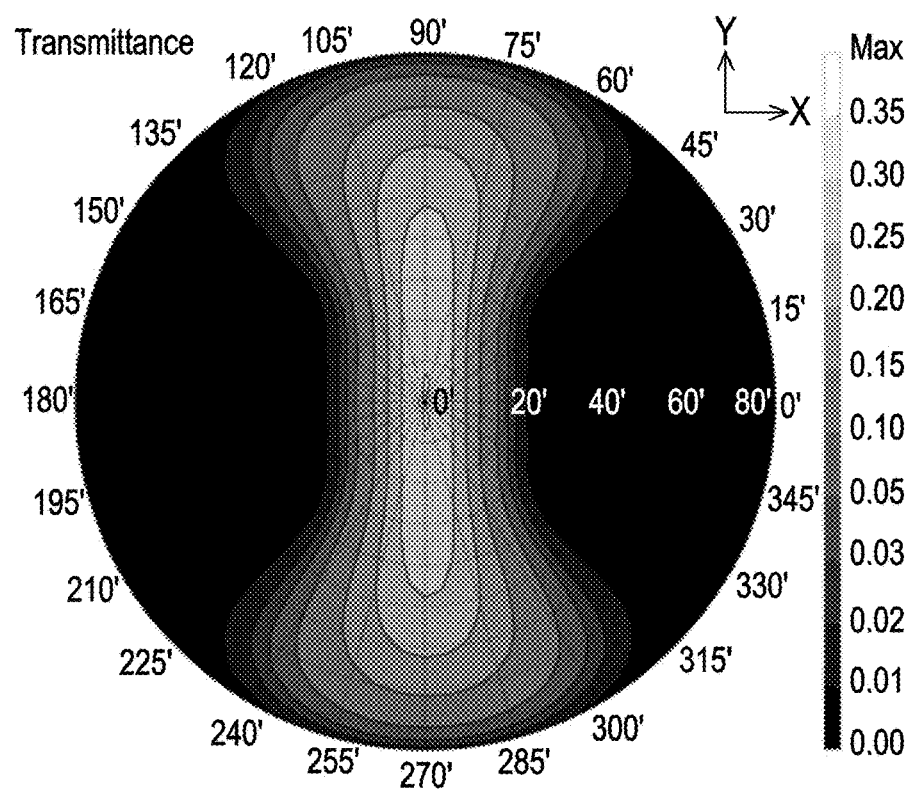
Figure 25C:
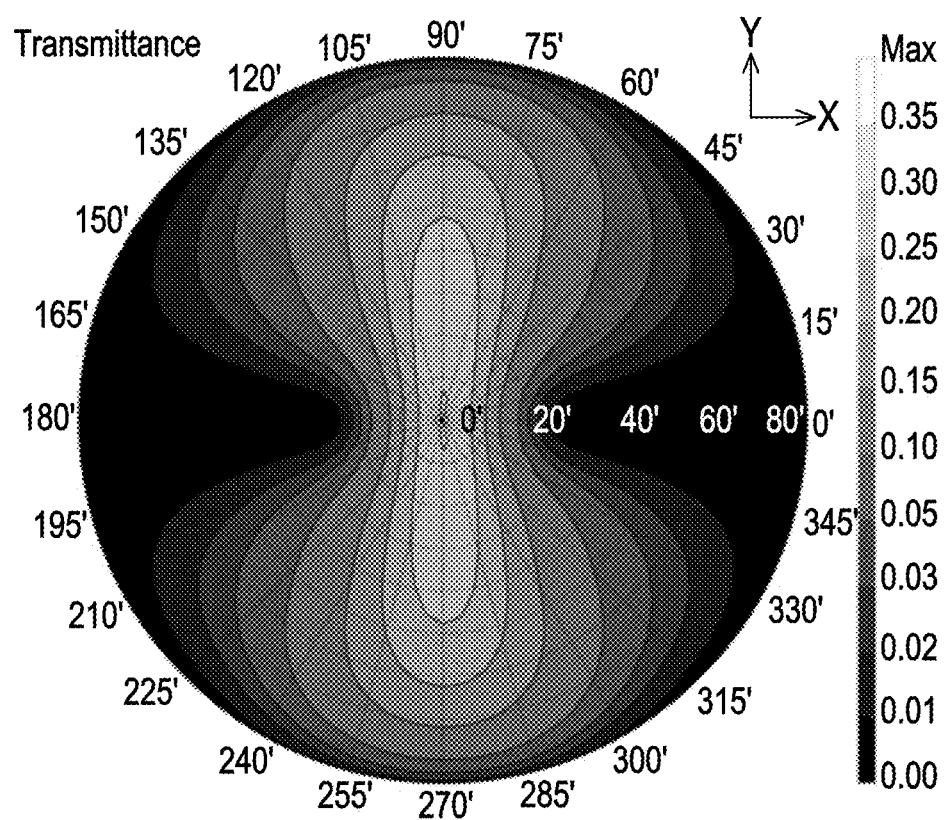

FIG. 24 is a schematic diagram of a display apparatus according to the tenth embodiment of the disclosure. FIG. 25A to FIG. 25C are respectively distribution diagrams of transmission rates of the display apparatus of FIG. 24 under compensation films with different in-plane phase retardations. With reference to FIG. 24, the difference between a display apparatus 30 of this embodiment and the display apparatus 10B of FIG. 8 lies in the composition of the display apparatus. Specifically, the display apparatus 30 also includes another viewing angle limiting device 200', configured to replace the compensation film 410 of the display apparatus 10B. That is, the viewing angle limiting device 200' is disposed between the compensation film 420 and the light polarization converter 300, and the compensation film 420 is disposed between the viewing angle limiting device 200 and the viewing angle limiting device 200'. Since the composition structure of the viewing angle limiting device 200' of this embodiment is similar to the viewing angle limiting device 200, for detailed description of the viewing angle limiting device 200', reference may be made to the relevant paragraphs in the above embodiments, which will not be repeatedly described herein.

Notably, through disposing the viewing angle limiting device 200', an anti-peeping range of the display apparatus 30 is further increased. In this embodiment, the in-plane phase retardation of the compensation film 420 may be between one-tenth wavelength and one wavelength. For example, when the in-plane phase retardation of the compensation film 420 is one-half wavelength, the anti-peeping range of the display apparatus 30 is increased. For example, anti-peeping of the display apparatus 30 in the directions at the azimuth angles of the 45 degrees and 315 degrees is increased (as shown in FIG. 25A). In the compensation film 420, the axial direction of the optical axis 420n of the part of the partitions (i.e., second partitions) corresponding to the first regions 300A1 (e.g., the partition 420A1) is perpendicular to the first light polarization direction P1.

When the in-plane phase retardation of the compensation film 420 is 220 nanometers, the anti-peeping of the display apparatus 30 is also increased in the directions at the azimuth angles of the 45 degrees and 315 degrees (as shown in FIG. 25B). In the compensation film 420, the axial direction of the optical axis 420n of the part of the partitions (i.e., second partitions) corresponding to the first regions 300A1 (e.g., the partition 420A1) is parallel to the first light polarization direction P1. When the in-plane phase retardation of the compensation film 420 is one-quarter wavelength, the anti-peeping range of the display apparatus 30 is reduced (as shown in FIG. 25C). In the compensation film 420, the axial direction of the optical axis 420n of the part of the partitions (i.e., second partition) corresponding to the first regions 300A1 (e.g., the partition 420A1) is perpendicular to the first light polarization direction P1.

Figure 26:
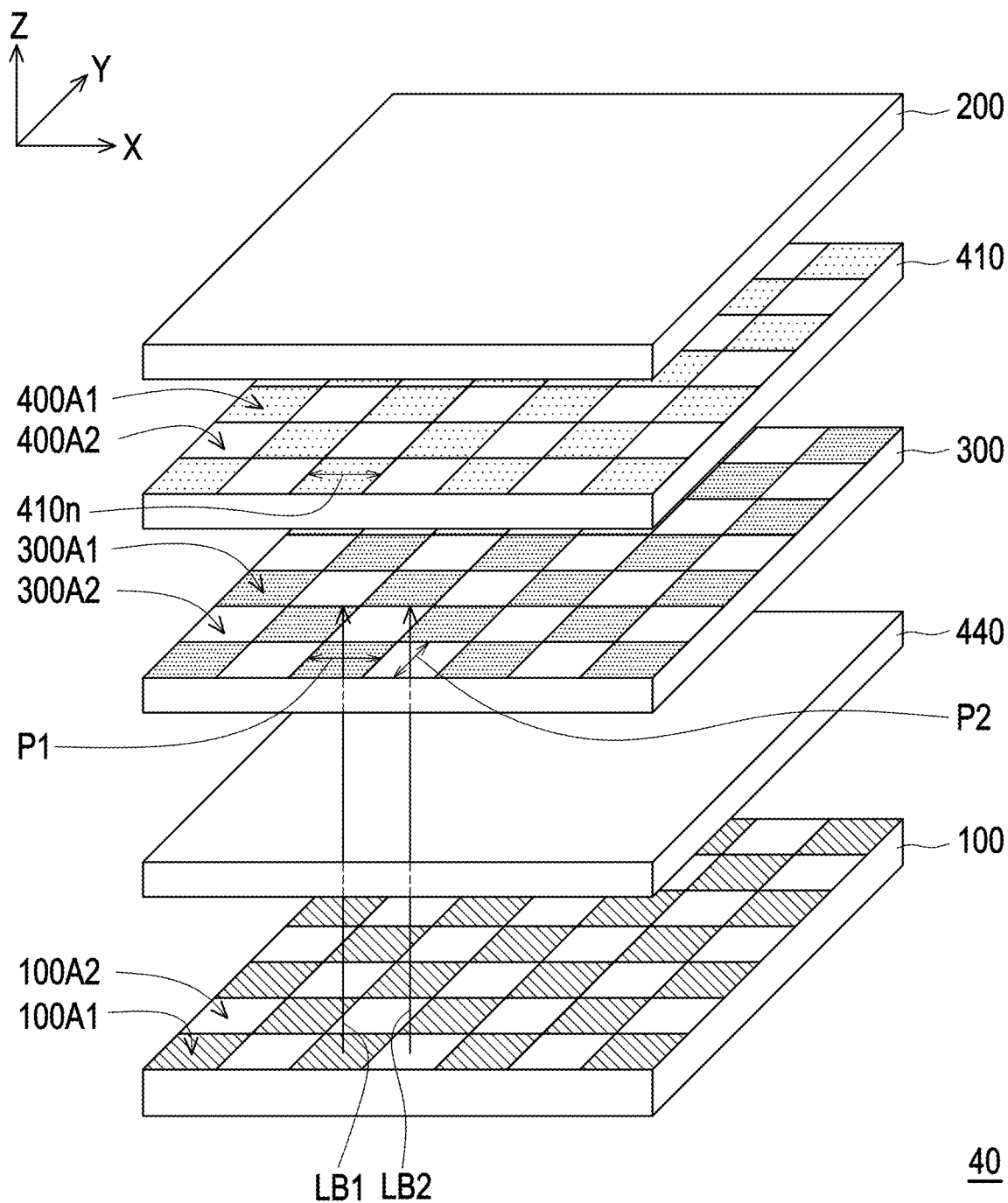
FIG. 26 is a schematic diagram of a display apparatus according to the eleventh embodiment of the disclosure.

FIG. 26 is a schematic diagram of a display apparatus according to the eleventh embodiment of the disclosure. With reference to FIG. 26, the difference between a display apparatus 40 of this embodiment and the display apparatus 10A of FIG. 6 lies in that the display apparatus 40 also includes a quarter-wave plate 440, disposed between the display panel 100 and the light polarization converter 300. Accordingly, reflectivity of the display apparatus 40 to the external ambient light is reduced, facilitating an increase in its display quality (e.g., black state contrast).

Figure 27:
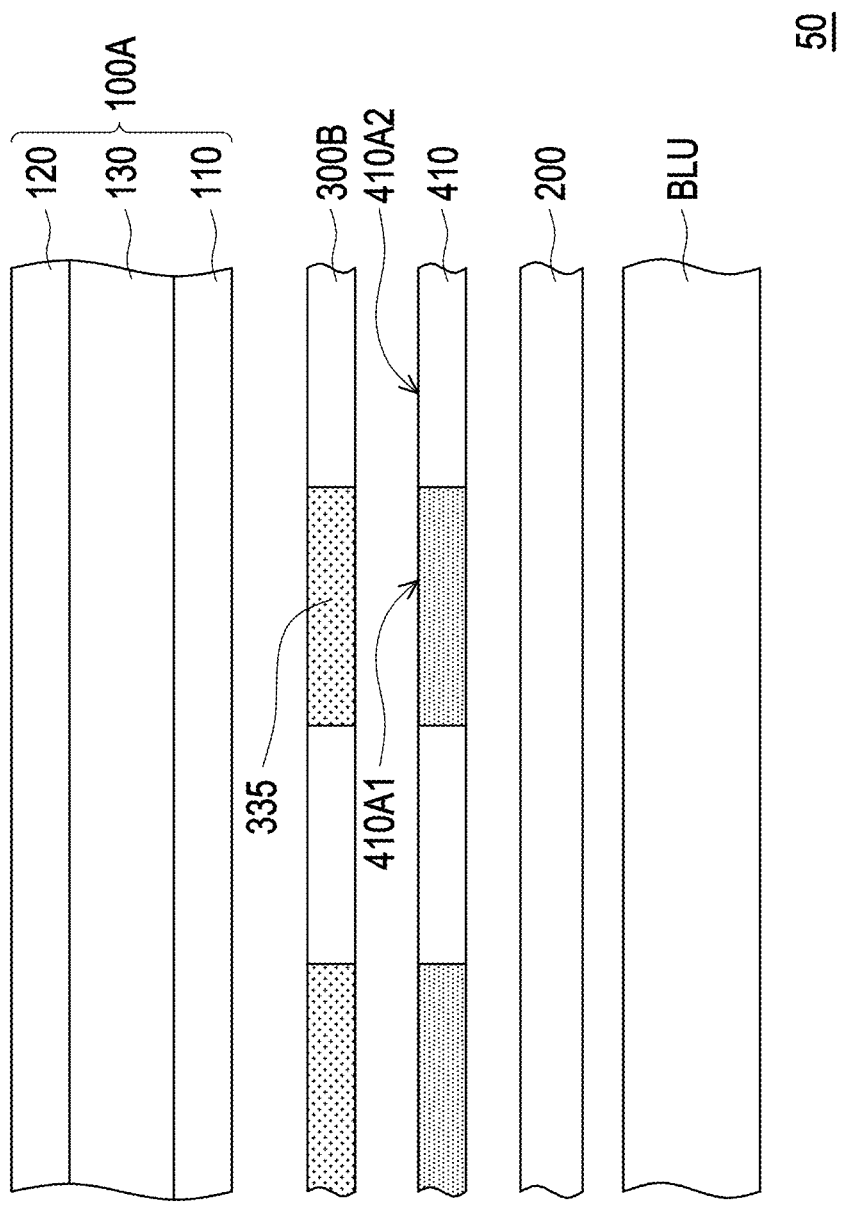
FIG. 27 is a schematic diagram of a display apparatus according to the twelfth embodiment of the disclosure.
Figure 28:
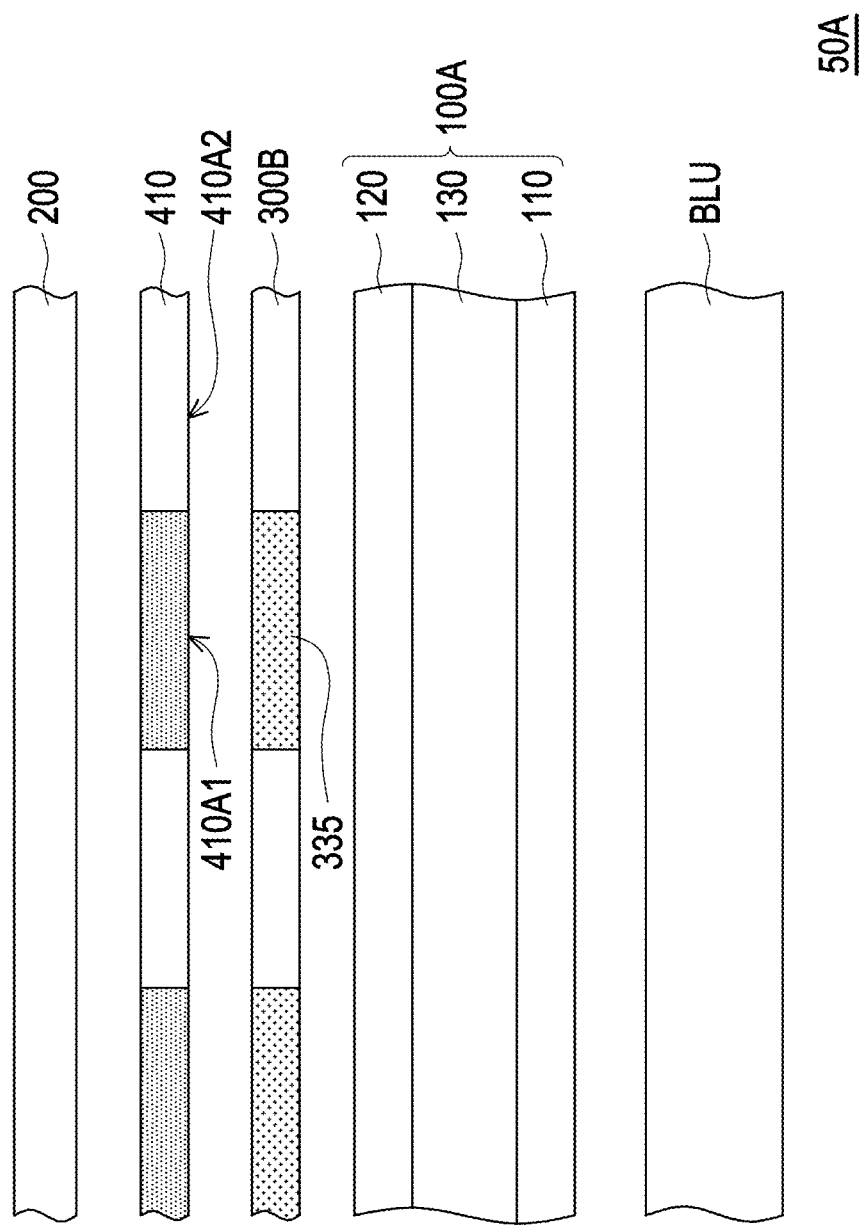
FIG. 28 is a schematic diagram of a display apparatus according to the thirteenth embodiment of the disclosure.

FIG. 27 is a schematic diagram of a display apparatus according to the twelfth embodiment of the disclosure. FIG. 28 is a schematic diagram of a display apparatus according to the thirteenth embodiment of the disclosure. In particular, for the sake of clarity, illustration of the substrate 310 of FIG. 5 is omitted in the light polarization converter 300B in FIG. 27 and FIG. 28. With reference to FIG. 27, the difference between a display apparatus 50 of this embodiment and the display apparatus 10A of FIG. 6 lies in the composition and configuration of the display apparatus. In this embodiment, a display panel 100A is a non-self-luminous display panel, such as but not limited to a liquid crystal display panel. Therefore, the display apparatus 50 of this embodiment also includes a backlight module BLU, disposed to be overlapped with the display panel 100A, the viewing angle limiting device 200, the light polarization converter 300B, and the compensation film 410.

For example, the display panel 100A may include a liquid crystal cell 130, and a linear polarizer 110 and a linear polarizer 120 disposed on two opposite sides of the liquid crystal cell 130. The backlight module BLU may be a general backlight module of combined multiple brightness enhancement films (e.g., 3M BEF, not shown) and diffusion films (not shown), or a light condensing backlight module using reverse prism films (e.g., DNP W528, not shown). In this embodiment, the structure of the light polarization converter 300B is similar to the light polarization converter 300A of FIG. 5, and the difference is that a linear polarizer of the light polarization converter 300B of this embodiment is also the linear polarizer 110 of the display panel 100A. That is, it is possible that the light polarization converter 300B includes the optical compensation patterns 335 disposed to be overlapped with the first regions 300A1 (as shown in FIG. 5), and does not include a linear polarizer.

On the other hand, in this embodiment, the light polarization converter 300B and the viewing angle limiting device 200 are located between the display panel 100A and the backlight module BLU, but they are not limited thereto. In another embodiment, as shown in FIG. 28, the display panel 100A and the light polarization converter 300B of a display apparatus 50A may also be disposed between the backlight module BLU and the viewing angle limiting device 200. The linear polarizer of the light polarization converter 300B is also the linear polarizer 120 of the display panel 100A. Since the composition and structure of the light polarization converter 300B, the compensation film 410, and the viewing angle limiting device 200 of this embodiment are similar to the light polarization converter 300A, the compensation film 410, and the viewing angle limiting device 200 of the above embodiment, reference may be made to the relevant paragraphs in the above embodiment for detailed description, which will not be repeatedly described herein.

In summary of the foregoing, in the display apparatus according to an embodiment of the disclosure, the absorption coefficient of the viewing angle limiting device in the thickness direction thereof is greater than the absorption coefficient in the direction perpendicular to the thickness direction, accordingly increasing filtering of the viewing angle limiting device on non-normally incident polarized light beams. The light beams from the display panel has different polarization directions after passing through the first regions and the second regions of the light polarization converter, and light beams with a specific polarization direction are absorbed after being obliquely incident into the viewing angle limiting device. Through different dimming characteristics of the two regions of the light polarization converter, anti-peeping in different directions is realized. On the other hand, with the assistance of display signal control from the display panel, the display apparatus switches between the different anti-peeping modes and the sharing mode with a full viewing angle, facilitating an increase in applicability and operating convenience of the display apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising a light polarization converter, at least one viewing angle limiting device, and a display panel, wherein
   the light polarization converter comprises a plurality of first regions and a plurality of second regions alternately arranged, and light beams passing through the plurality of first regions and the plurality of second regions respectively have a first light polarization direction and a second light polarization direction;
   the at least one viewing angle limiting device is disposed to be overlapped with the light polarization converter, and the at least one viewing angle limiting device comprises:
      a plurality of light-absorbing molecules, wherein the plurality of light-absorbing molecules have a first absorption coefficient in a thickness direction of the at least one viewing angle limiting device and have a second absorption coefficient in a direction perpendicular to the thickness direction, and a ratio of the first absorption coefficient to the second absorption coefficient is greater than 1; and
   the display panel is disposed to be overlapped with the at least one viewing angle limiting device, wherein the light polarization converter is disposed between the at least one viewing angle limiting device and the display panel.

2. The display apparatus according to claim 1, further comprising:
   a first compensation film disposed between the at least one viewing angle limiting device and the light polarization converter, wherein the first compensation film comprises a plurality of first partitions, and the plurality of first partitions respectively correspond to the plurality of first regions and the plurality of second regions, wherein the first light polarization direction intersects the second light polarization direction, and an axial direction of an optical axis of the plurality of first partitions corresponding to the plurality of first regions is parallel to the first light polarization direction.

3. The display apparatus according to claim 2, further comprising:
   a second compensation film disposed between the at least one viewing angle limiting device and the first compensation film, wherein the second compensation film comprises a plurality of second partitions, and the plurality of second partitions respectively correspond to the plurality of first partitions, wherein an axial direction of an optical axis of the plurality of second partitions of the second compensation film is perpendicular to an axial direction of an optical axis of the plurality of first partitions corresponding to the plurality of second partitions.

4. The display apparatus according to claim 1, further comprising a first compensation film and a second compensation film, wherein
   the first compensation film is disposed between the at least one viewing angle limiting device and the light polarization converter; and
   the second compensation film is disposed between the at least one viewing angle limiting device and the first compensation film, wherein the first light polarization direction intersects the second light polarization direction, an axial direction of an optical axis of the first compensation film is parallel to the first light polarization direction, and an axial direction of an optical axis of the second compensation film is perpendicular to the first light polarization direction.

5. The display apparatus according to claim 3, wherein in-plane phase retardations of the first compensation film and the second compensation film are between one-quarter wavelength and one wavelength.

6. The display apparatus according to claim 4, wherein in-plane phase retardations of the first compensation film and the second compensation film are between one-quarter wavelength and one wavelength.

7. The display apparatus according to claim 1, wherein the display panel is a liquid crystal display panel, and the light polarization converter comprises a plurality of optical compensation patterns disposed to be overlapped with the plurality of first regions.

8. The display apparatus according to claim 1, wherein the light polarization converter comprises a linear polarizer and an electrically controlled viewing angle switcher, wherein
the electrically controlled viewing angle switcher is disposed between the linear polarizer and the at least one viewing angle limiting device, and the electrically controlled viewing angle switcher comprises a first electrode corresponding to the plurality of first regions and a second electrode corresponding to the plurality of second regions.

9. The display apparatus according to claim 8, further comprising:
a first compensation film disposed between the electrically controlled viewing angle switcher and the linear polarizer, wherein an axial direction of an optical axis of the first compensation film is perpendicular to an axial direction of an absorption axis of the linear polarizer.

10. The display apparatus according to claim 9, further comprising:
a second compensation film disposed between the at least one viewing angle limiting device and the first compensation film, wherein an axial direction of an optical axis of the second compensation film is parallel to the axial direction of the absorption axis of the linear polarizer.

11. The display apparatus according to claim 8, wherein the electrically controlled viewing angle switcher comprises a liquid crystal layer, a first alignment film, and a second alignment film, wherein
the first alignment film is disposed between the liquid crystal layer and the linear polarizer, wherein a first alignment direction of the first alignment film is parallel or perpendicular to an axial direction of an absorption axis of the linear polarizer; and
the second alignment film is disposed between the liquid crystal layer and the at least one viewing angle limiting device, wherein the liquid crystal layer is sandwiched between the first alignment film and the second alignment film.

12. The display apparatus according to claim 8, wherein the electrically controlled viewing angle switcher comprises a liquid crystal layer, a first alignment film, and a second alignment film, wherein
the first alignment film is disposed between the liquid crystal layer and the linear polarizer, wherein an angle between a first alignment direction of the first alignment film and an axial direction of an absorption axis of the linear polarizer is 45 degrees; and
the second alignment film is disposed between the liquid crystal layer and the at least one viewing angle limiting device, wherein the liquid crystal layer is sandwiched between the first alignment film and the second alignment film.

13. The display apparatus according to claim 1, further comprising a compensation film, wherein the at least one viewing angle limiting device comprises a first viewing angle limiting device and a second viewing angle limiting device, the compensation film is located between the first viewing angle limiting device and the second viewing angle limiting device, and an in-plane phase retardation of the compensation film is between one-tenth wavelength and one wavelength.

14. The display apparatus according to claim 1, further comprising a backlight module disposed to be overlapped with the display panel, the at least one viewing angle limiting device, and the light polarization converter, wherein the light polarization converter and the at least one viewing angle limiting device are located between the display panel and the backlight module.

15. The display apparatus according to claim 1, wherein the light polarization converter comprises a polarization layer, wherein the polarization layer has a first absorption axis in the plurality of first regions and has a second absorption axis in the plurality of second regions, and an axial direction of the first absorption axis intersects an axial direction of the second absorption axis.

16. The display apparatus according to claim 1, wherein the light polarization converter comprises a linear polarizer and a plurality of optical compensation patterns, wherein
the linear polarizer is completely overlapped with the plurality of first regions and the plurality of second regions; and
the plurality of optical compensation patterns are disposed to be overlapped with the plurality of first regions, wherein an angle between an axial direction of an optical axis of the plurality of optical compensation patterns and an axial direction of an absorption axis of the linear polarizer is 45 degrees, and the plurality of optical compensation patterns are located between the linear polarizer and the at least one viewing angle limiting device.

17. The display apparatus according to claim 1, further comprising a quarter-wave plate disposed between the display panel and the light polarization converter.

18. The display apparatus according to claim 1, wherein the at least one viewing angle limiting device further comprises a polymer substrate, and the plurality of light-absorbing molecules are dispersedly disposed in the polymer substrate.

19. The display apparatus according to claim 1, wherein the ratio of the first absorption coefficient to the second absorption coefficient is between 10 and 1,000.

* * * * *